(12) United States Patent
Webel et al.

(10) Patent No.: US 11,989,071 B2
(45) Date of Patent: May 21, 2024

(54) DYNAMIC GUARD BAND WITH TIMING PROTECTION AND WITH PERFORMANCE PROTECTION

(71) Applicant: INTERNATIONAL BUSINESS MACHINES CORPORATION, Armonk, NY (US)

(72) Inventors: Tobias Webel, Schwaebisch-Gmuend (DE); Alejandro Alberto Cook Lobo, Stuttgart (DE); Andrew A. Turner, Underhill, VT (US); Christian Jacobi, West Park, NY (US); Eberhard Engler, Tübingen (DE); Edward C. McCain, Lagrangeville, NY (US); Kevin P. Low, Poughkeepsie, NY (US); Phillip John Restle, Katonah, NY (US); Pradeep Bhadravati Parashurama, Bhadravati (IN); Alper Buyuktosunoglu, White Plains, NY (US); Karl Evan Smock Anderson, Poughkeepsie, NY (US); Sean Michael Carey, Dutchess, NY (US); Kennedy Cheruiyot, Gardiner, NY (US); Daniel Kiss, Stuttgart (DE); Isidore G. Bendrihem, Fort Lee, NJ (US); Eric Jason Fluhr, Leander, TX (US); Ian Krispin Carmichael, Round Rock, TX (US); Gregory Scott Still, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 17/813,346

(22) Filed: Jul. 19, 2022

(65) Prior Publication Data
US 2024/0028095 A1    Jan. 25, 2024

(51) Int. Cl.
*G06F 1/00* (2006.01)
*G06F 1/28* (2006.01)
(Continued)

(52) U.S. Cl.
CPC .............. *G06F 1/28* (2013.01); *G06F 9/4893* (2013.01)

(58) Field of Classification Search
CPC ................................. G06F 1/28; G06F 9/4893
See application file for complete search history.

(56) References Cited

U.S. PATENT DOCUMENTS

| 7,933,101 B2 | 4/2011 | Bourgeau et al. |
| 9,395,782 B2 | 7/2016 | Berry et al. |

(Continued)

FOREIGN PATENT DOCUMENTS

WO    2022115192 A1    6/2022

OTHER PUBLICATIONS

Anonymously, "A Method for Mitigating On-Chip Supply Voltage Noise by Boosting the Supply Voltage through Capacitive Coupling", IPCOM000248242D, ip.com; Nov. 10, 2016, 4p.

(Continued)

*Primary Examiner* — Xuxing Chen
(74) *Attorney, Agent, or Firm* — CANTOR COLBURN LLP; Edward Wixted

(57) ABSTRACT

Embodiments include in response to monitoring a processor during operation, detecting a first number of throttling amounts in the processor, determining that the first number of throttling amounts fulfills a first condition regarding a throttling amounts threshold, and modifying a voltage level of the processor by a first amount. Embodiments include in response to modifying the voltage level of the processor by the first amount, detecting a second number of throttling amounts in the processor, determining that the second num- (Continued)

ber of throttling amounts fulfills a second condition regarding the throttling amounts threshold, and modifying the voltage level of the processor by a second amount.

20 Claims, 15 Drawing Sheets

(51) Int. Cl.
  *G06F 9/48* (2006.01)
  *G06F 11/30* (2006.01)

(56) References Cited

U.S. PATENT DOCUMENTS

| | | | |
|---|---|---|---|
| 10,009,016 | B1 | 6/2018 | Ho et al. |
| 10,552,250 | B2 | 2/2020 | Biran et al. |
| 10,571,945 | B2 | 2/2020 | Pishdad et al. |
| 10,860,082 | B2 | 12/2020 | Berke et al. |
| 10,908,668 | B2 | 2/2021 | Keceli et al. |
| 10,928,886 | B2 | 2/2021 | Mosalikanti et al. |
| 11,036,253 | B1 | 6/2021 | Paternoster et al. |
| 11,275,644 | B2 | 3/2022 | Biran et al. |
| 2004/0230865 | A1 | 11/2004 | Balazich et al. |
| 2007/0192636 | A1 | 8/2007 | Gonzalez et al. |
| 2009/0063065 | A1 | 3/2009 | Weekly |
| 2009/0063884 | A1 | 3/2009 | Weekly |
| 2012/0166854 | A1 | 6/2012 | Rotem et al. |
| 2014/0002047 | A1 | 1/2014 | Houston et al. |
| 2015/0378412 | A1 | 12/2015 | Suryanarayanan et al. |
| 2016/0179163 | A1 | 6/2016 | Haider et al. |
| 2016/0370837 | A1 | 12/2016 | Shi et al. |
| 2017/0123482 | A1 | 5/2017 | Berke et al. |
| 2017/0214399 | A1* | 7/2017 | Zogopoulos .......... G06F 1/3206 |
| 2017/0329391 | A1 | 11/2017 | Jaffari et al. |
| 2017/0344102 | A1 | 11/2017 | Kolla et al. |
| 2017/0357298 | A1* | 12/2017 | Hovis .................... G06F 1/324 |
| 2018/0067532 | A1 | 3/2018 | Chuang et al. |
| 2018/0067541 | A1 | 3/2018 | Chuang et al. |
| 2018/0091125 | A1 | 3/2018 | Carlson et al. |
| 2018/0183417 | A1 | 6/2018 | Ho et al. |
| 2019/0041942 | A1 | 2/2019 | Keceli et al. |
| 2019/0108087 | A1 | 4/2019 | Biran et al. |
| 2020/0089299 | A1 | 3/2020 | Kim et al. |
| 2020/0110656 | A1 | 4/2020 | Biran et al. |
| 2020/0257349 | A1* | 8/2020 | Lobo .......................... G06F 1/30 |
| 2021/0124382 | A1 | 4/2021 | Deka et al. |
| 2021/0389353 | A1 | 12/2021 | Bhargava et al. |
| 2022/0091656 | A1* | 3/2022 | Nge ........................ G06F 1/325 |
| 2022/0130432 | A1 | 4/2022 | Jayapal et al. |
| 2022/0404886 | A1* | 12/2022 | Parashurama ........ G06F 1/3243 |
| 2023/0144770 | A1 | 5/2023 | Chapman et al. |
| 2023/0324947 | A1 | 10/2023 | Mehra et al. |

OTHER PUBLICATIONS

Anonymously, "Method and apparatus for concurrent circuit reliability check for adaptive guard banding and improved RAS performance" ip.com; IPCOM000226248D, Mar. 25, 2013, 5p.

Anonymously, "Method and apparatus for efficient power management in sever system design"; ip.com; IPCOM000212180D; Nov. 3, 2011, 4 p.

Anonymously, "Method for Memory Power Management", ip.com, IPCOM000228822D, Jul. 9, 2013, 5p.

Anonymously, "Technique for Voltage Linearity in Digital Droop Monitors", Ip.com; IPCOM000269385D; Apr. 12, 2022, 2p.

Cook Lobo et al., "Dynamic Guard Band With Timing Protection and With Performance Protection" U.S. Appl. No. 17/813,341, filed Jul. 19, 2022.

Floyd, "Voltage Droop Reduction Using Throttling Controlled by Timing Margin Feedback", research gate; Jun. 2012, 3p.

Fugger, "Fast All-Digital Clock Frequency Adaptation Circuit for Voltage Droop Tolerance", 2018 24th IEEE International Symposium on Asynchronous Circuits and Systems (ASYNC), Dec. 27, 2018, 10p.

Jiang, "Dynamic Droop Approach for Storage-based Frequency Control", arxiv.org; Oct. 11, 2019, 7p.

List of IBM Patents or Patent Applications Treated as Related; Date Filed: Jul. 19, 2022, 2 pages.

Peng, "Emulating and Diagnosing IR-Drop by Using Dynamic SDF", The 15th Asia and South Pacific Design Automation Conference ASP-DAC 2010, Jan. 20, 2010; 22p.

Zheng, "A Comparison of Digital Droop Detection Techniques in ASAP7 FinFET", EE 241 Spring 2020 Final Project Reports, 2020; 6p.

International Search Report; International Application No. PCT/IB2023/057260; International Filing Date: Jul. 17, 2023; Date of mailing: Oct. 19, 2023; 12 pages.

International Search Report; International Application No. PCT/IB2023/057259; International Filing Date: Jul. 17, 2023; Date of mailing: Oct. 25, 2023; 11 pages.

* cited by examiner

FIG. 5  500 PERFORMANCE PROTECTION

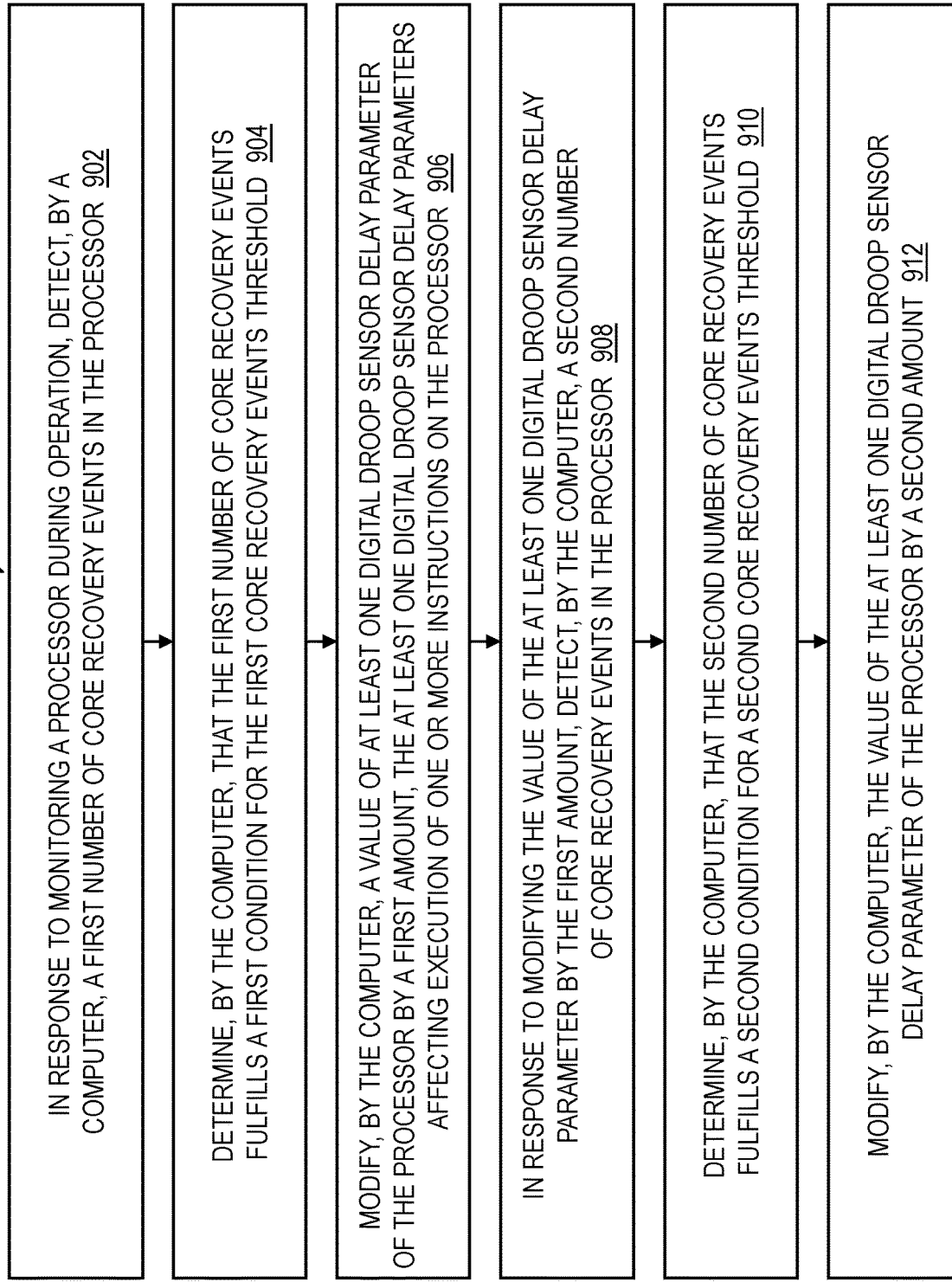

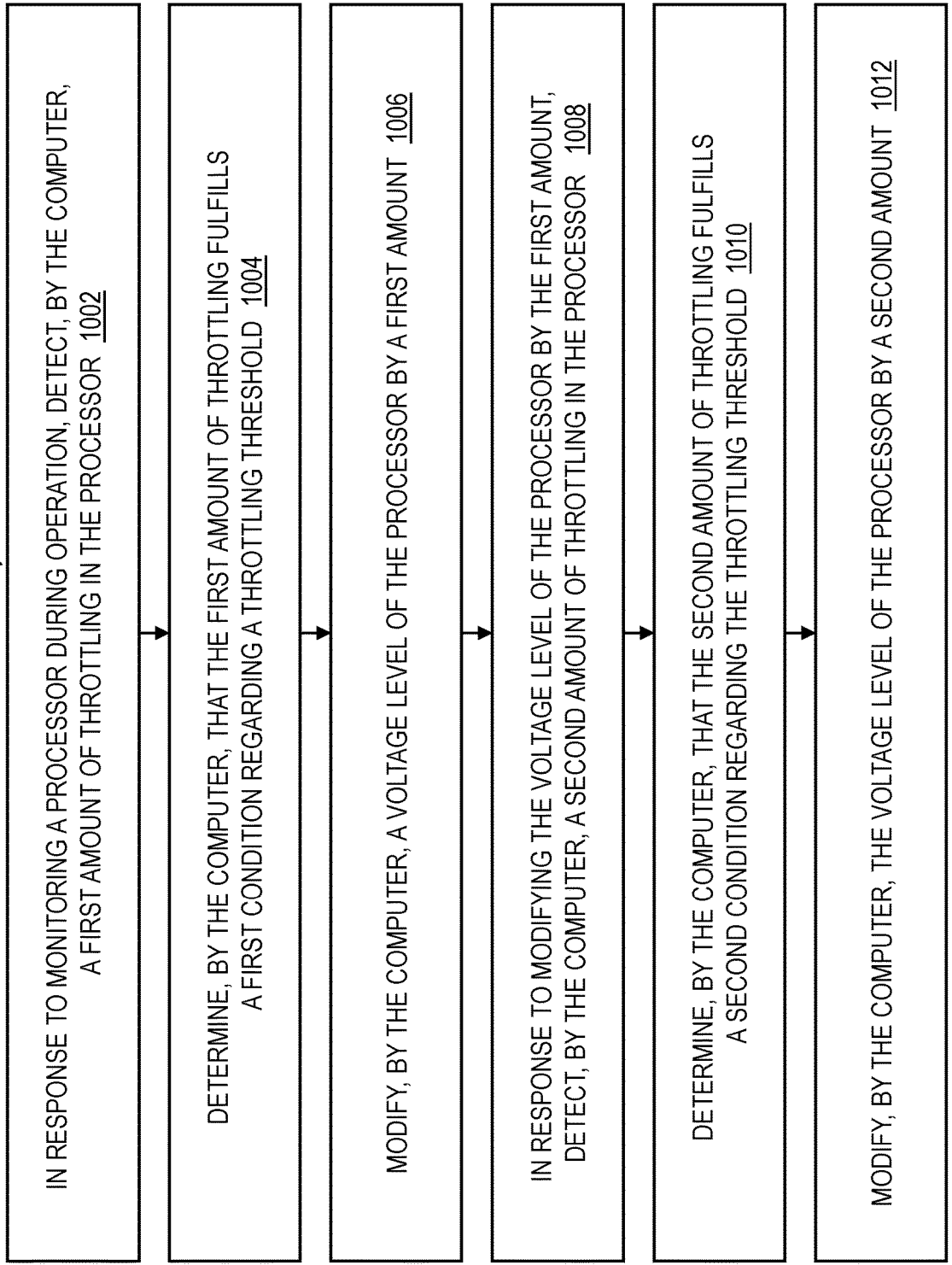

DYNAMIC GUARD BAND WITH TIMING PROTECTION AND WITH PERFORMANCE PROTECTION

BACKGROUND

The present invention generally relates to computer systems, and more specifically, to computer-implemented methods, computer systems, and computer program products configured and arranged to provide dynamic guard band with timing protection and/or with performance protection.

In distributed computing environments, there can be numerous jobs or queries arriving as workloads to be processed on a processor in the computing environment. A processor core is a processing unit that reads instructions to perform specific actions. Instructions are chained together so that, when run in real-time on the processor, the processor executes the desired workload formed by the instructions. A multicore processor is a computer processor on a single integrated circuit with two or more separate processing units, which are the cores, each of which reads and executes program instructions. The instructions are ordinary instructions (such as add, move data, branch, etc.) but the single processor can run instructions on separate cores at the same time, increasing the overall speed for programs that support multithreading or other parallel computing techniques.

Problems can occur in the operation of a processor, and cores of the processor are run to avoid problems. A technique is needed to improve processor timing and/or performance.

SUMMARY

Embodiments of the present invention are directed to computer-implemented methods for dynamic guard band with timing protection and/or with performance protection. A non-limiting computer-implemented method includes in response to monitoring a processor during operation, detecting, by the computer, a first number of throttling amounts in the processor and determining, by the computer, that the first number of throttling amounts fulfills a first condition regarding a throttling amount threshold. The method includes modifying, by the computer, a voltage level of the processor by a first amount and in response to modifying the voltage level of the processor by the first amount, detecting, by the computer, a second number of throttling amounts in the processor. Also, the method includes determining, by the computer, that the second number of throttling amounts fulfills a second condition regarding the throttling amounts threshold and modifying, by the computer, the voltage level of the processor by a second amount.

This can provide an improvement over known methods for using a static guard band by reducing performance degradation for a workload on a processor core by increasing the supply voltage to the processor core(s) of a processor when processing instructions of the workload becomes intense or highly variable (noisy), thereby preventing the workload from having multiple (or subsequent) cycles with suspended execution. Once the number of cycles with suspended execution cycles reduces (or is zero), this indicates that intense or noisy phase of the workload is complete, and the supply voltage can be decreased.

In addition to one or more of the features described above or below, or as an alternative, further embodiments of the invention disclose that modifying the voltage level of the processor by the first amount comprises increasing the voltage level of the processor by the first amount. This advantageously improves the flow of instructions of the workload by increasing the supply voltage, which allows the processor core to avoid cycles with suspended execution; this may also reduce circuit errors resulting in a reduced rate of recovery events, and may reduce the probably that the processor core experience an unrecoverable error or checkstop resulting in a service interruption.

In addition to one or more of the features described above or below, or as an alternative, further embodiments of the invention disclose that modifying the voltage level of the processor by the second amount comprises decreasing the voltage level of the processor by the second amount. This advantageously reduces power used by the processor core, when the intensity or variability of the workload reduces.

In addition to one or more of the features described above or below, or as an alternative, further embodiments of the invention disclose confirming that a power supply usage is less than a power supply usage threshold, prior to modifying the voltage level of the processor by the first amount. This advantageously confirms and ensures that the power supply usage of a processor chip or processor is within a tolerance before increasing the supply voltage.

In addition to one or more of the features described above or below, or as an alternative, further embodiments of the invention disclose checking if a power supply usage is greater than a power supply usage threshold and rejecting a request to modify the voltage level by the first amount and staying a current voltage level, in response to the power supply usage being greater than a power supply usage threshold. This advantageously prevents the supply voltage from being increased when the supply voltage has been increased to its maximum and/or the processor chip/processor approaches its maximum current or power usage.

In addition to one or more of the features described above or below, or as an alternative, further embodiments of the invention disclose providing a condition that reverts the voltage level to a default voltage level in response to determining that a power supply usage is greater than a maximum power supply usage threshold. This advantageously prevents failure of a processor core and/or processor when its power supply usage is greater than the maximum, thereby preventing power supply, regulator, or chip failure that could result in a service interruption or permanent damage to one or more system components.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 9 is a flowchart of a computer-implemented method for dynamic guard band with timing protection for processor cores of the processor according to one or more embodiments;

FIG. 10 is a flowchart of a computer-implemented method for dynamic guard band with performance protection for processor cores of the processor according to one or more embodiments;

DETAILED DESCRIPTION

One or more embodiments of the invention describe computer-implemented methods, computer systems, and computer program products configured and arranged to provide dynamic guard band with timing protection and/or dynamic guard band with performance protection for processor cores on a processor. The terms processor cores, cores, or core units may be used interchangeably. The terms processor, chip, processor chip, and integrated circuit may be used interchangeably. The timing guard band protection allows the timing guard band to be reduced at times which provides improved yield, improved power dissipation, and/or improved timing margin for the cores. Although timing margin may be discussed herein, it is noted that one or more embodiments equally apply to the timing and/or voltage margin. The digital droop sensor can be digital or analog and can be a timing sensor or voltage sensor. In one or more embodiments, the dynamic guard band with timing protection allows, under normal conditions such as a steady state workload, nominal temperature, etc., the processor to run at its nominal voltage with close to no voltage droop at all. Particularly, the processor runs with a reduced guard band (i.e., with reduced voltage margin and/or reduced timing margin) since the power supply noise is minimal and there are no large voltage droops. In the case when that workload switches from an idle state directly to a high activity workload, this change in activity manifests in a worst-case voltage droop (as discussed further herein).

There are typically a number of critical circuit paths in a core that will malfunction and result in errors when the voltage at that circuit drops to a critical value. In a core designed for high robustness, there are error-checking circuits that detect these errors. When an error is detected, the system can be returned to a checkpointed state before the error for a re-try attempt. The result is that most errors are recoverable. Even though most circuit errors are recoverable, a high rate of error recoveries can impact performance. In addition, if there are errors during the error recovery process itself, this may result in an unrecoverable error which can result in a more serious system interruption.

Figure 7A:
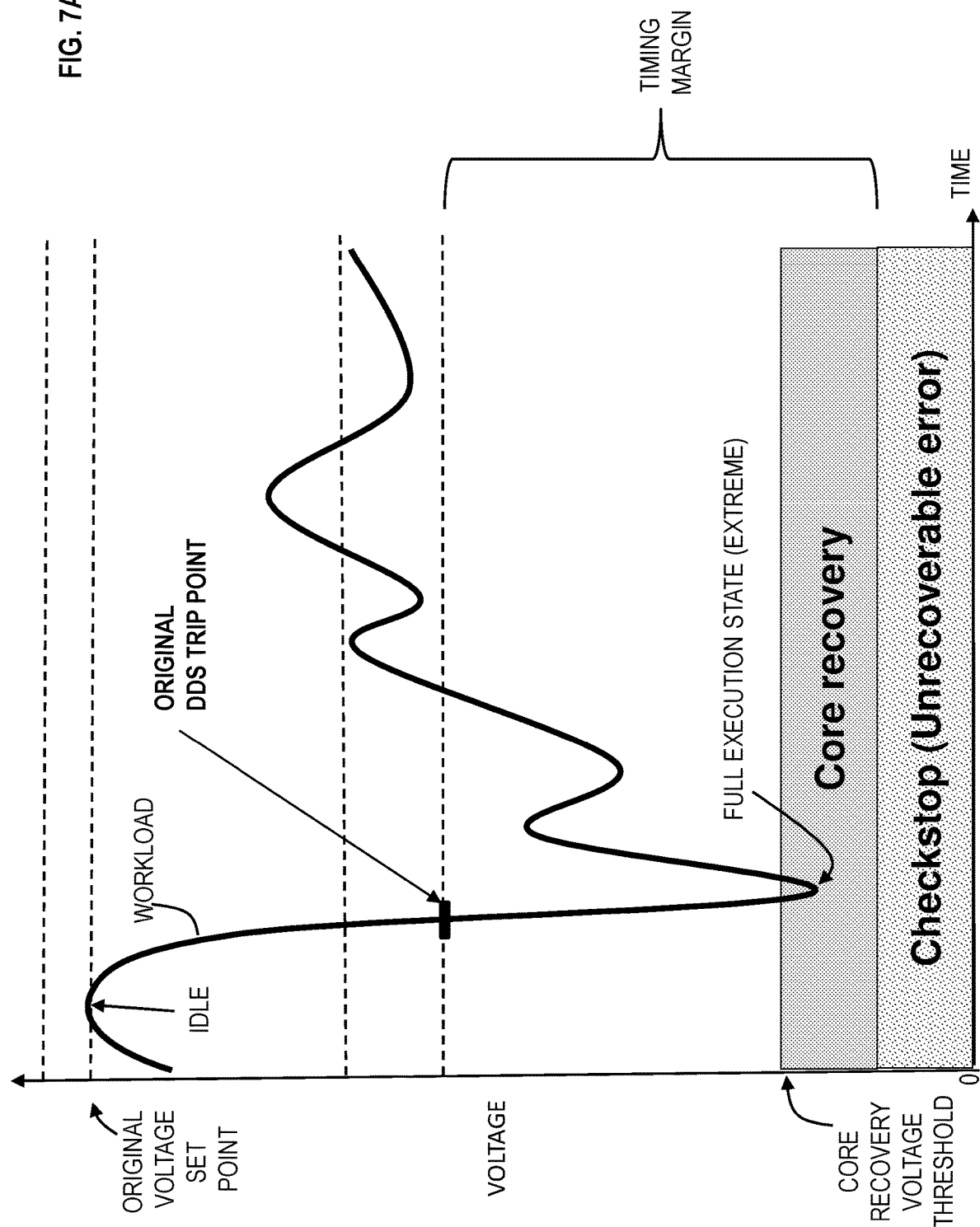
FIG. 7A depicts a graph of the voltage for the core executing a workload over time according to one or more embodiments of the present invention.
Figure 7B:
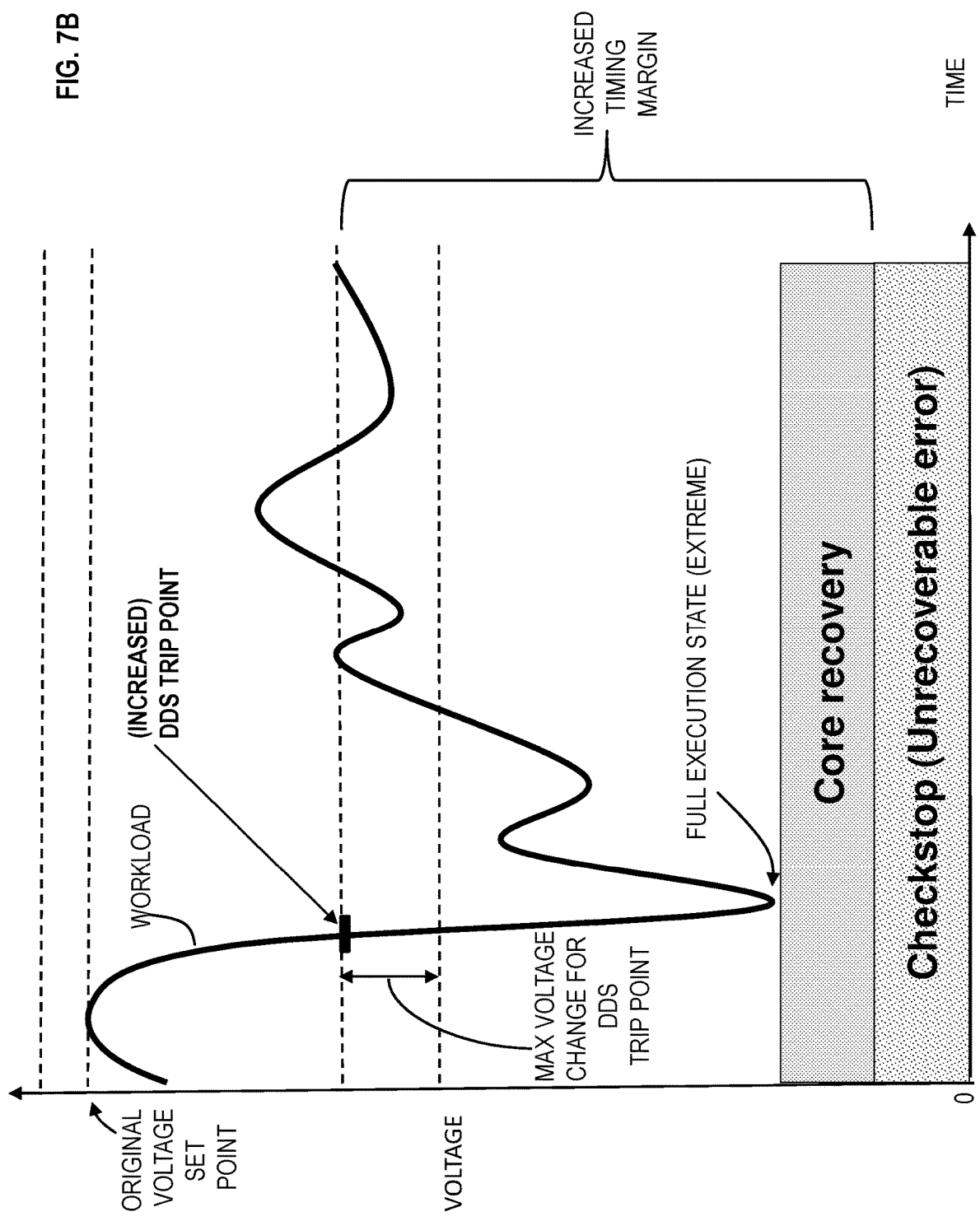
FIG. 7B depicts a graph of the voltage for the core executing the workload over time in which the voltage set point has been increased to a new voltage set point for the digital droop sensor trip point according to one or more embodiments of the present invention.

Without the technical benefits of one or more embodiments of this invention, the way to account for that is to (always) run at a constant voltage regulator setpoint voltage which is high enough to account for that worst case voltage droop. The voltage set point needed for each desired operating frequency is set during the manufacturing test of each chip and is stored in a non-volatile memory called the VPD (vital product data). Even if the voltage set point is kept constant, it is impossible to keep the voltage at the circuit level constant due to voltage regulator limitations as well as parasitic board, socket, and package resistance and inductance. When VDD current increases rapidly with time (also known as di/dt) the power supply droops at the on-chip circuit locations. The voltage difference (i.e., delta) from the voltage set point resulting in an error to the actual voltage set point is called the voltage margin as depicted in FIGS. 7A and 7B discussed herein.

In general, critical paths speed-up with increased voltage, thus increasing voltage increases timing margin. In manufacturing test, it is found that the Vmin-workload works without any circuit errors when the VDD setpoint is at or above a minimum value Vmin. To add margin during manufacturing test to account for different workloads, temperature variations, device degradation at end-of-life, etc., the VDD setpoint is increased by N % to Vmin+N*0.01V, resulting in N % timing margin (in units of V %) for the Vmin-workload in the manufacturing environment for the Vmin-workload. Next every droop sensor is calibrated when running this Vmin-workload, such that the minimum output value of each droop sensor is calibrated to the desired value corresponding to N % margin. Next a worst-case droop-workload (with large di/dt events causing worst-case droops) is run, and the droop sensors are tuned to mitigate these worst-case droops such that the minimum droop-sensor output never drops below the desired calibration value, thus maintaining N % margin at every droop-sensor location during the droop-workload. This droop sensing tuning is tuned to provide the desired N % margin over a range of VDD setpoint values. At lower VDD setpoints, when higher-current workloads with larger di/dt events are run, the droop sensors will detect droops more often, droop mitigation will be required more often to maintain the desired N % timing margin at every sensor location. Each Droop-mitigation event, or period of constant droop mitigation generally results in clock frequency reductions or instruction-throttling which can reduce performance. Thus, after droop-sensor calibration and tuning, the next step is to choose a VDD setpoint that is high enough that droop-mitigation events are rare, such that no unacceptable performance loss occurs for a chosen performance-workload. The calibration and tuning parameters for each droop sensor as well as the VDD setpoint that results in acceptable performance are stored in the VPD. If the Vmin-workload, the droop-workload, and the performance-workload accurately reflect the customer environment, and if the power delivery network (PDN) and thermal environment in the manufacturing-test environment accurately match the customer environment, there will also be N % timing margin in the customer application. Unfortunately, it is difficult to predict and account for the characteristics of all customer workloads, the PDN, and the thermal environment during manufacturing test. Thus, to guarantee system reliability, the timing margin N % is typically increased. This results in higher voltages and higher power. Voltages are typically limited due to device and dielectric long-term reliability concerns, and power is also limited by cooling capacity constraints. Thus, increasing N % to increase timing margin generally reduces chip yield as well as achievable system performance. One or more embodiments are configured to provide a reduction in the timing margin which is a benefit for static and dynamic power consumption and chip yield. In other words, the reduced timing margin allows processors to be run at higher clock frequencies, or alternatively more cores or processors can be configured while staying within voltage and power constraints, thereby improving the functioning of a computer system. Particularly, one or more embodiments use a dynamic guard band to account for an idle workload (or a small workload) that requires little or no processing as well as an extreme workload that requires intensive processing. The dynamic guard band uses a droop sensor trip point to account for the variations any variations in the devices on the chip, the chip itself, the power delivery network, the chip thermal environment, or the workloads being run on the chip, such that the dynamic guard band can be automatically changed on the fly (continuously) in the computing environment.

Droop sensors may be digital or analog, and may sense voltage directly, or they may sense a circuit delay, which is sensitive to voltage as well as cycle time. In one or more embodiments, a digital droop sensor is used that is sensitive to both voltage and cycle-time. The digital delay sensor is calibrated by adding or subtracting delay elements from a delay line. Any type of analog or digital droop sensor may be used to calibrate and tune the droop sensor. In one embodiment, the droop sensor is calibrated using a Vmin workload, then a separate tuning process is used to choose the threshold to trigger a droop-mitigation reaction in the case of a worst-case large and fast droop. In other embodiments, different methods and sequences may be used to calibrate and/or tune droop sensors to provide the desired droop-mitigation behavior. Further, the droop sensor could be any kind of margin sensor, such as an analog timing sensor, a digital voltage sensor, or analog voltage sensor. In general, any type of margin sensor could be utilized in one or more embodiments. Since the digital droop sensor is a timing margin sensor, the system can adjust the threshold of this timing margin sensor by adjusting/calibrating the delay of the digital droop sensor. It should be appreciated that other margin sensors with various kinds of thresholds can be used in one or more embodiments. In one or more embodiments, it may be found that timing or voltage margin is sensitive to temperature. Thus, the system may adjust the margin threshold as a function of temperature, in order to avoid recoverable errors even before they happen at a high temperature.

Figure 8A:
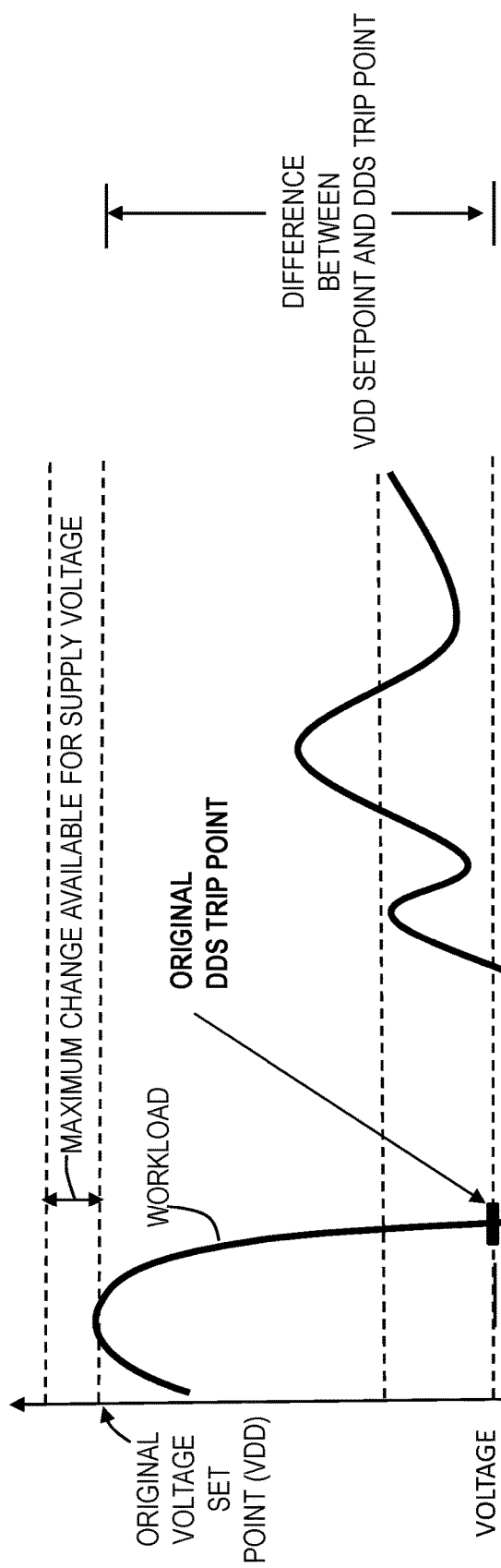
FIG. 8A depicts a graph of the voltage for the core executing a workload over time according to one or more embodiments of the present invention.
Figure 8B:
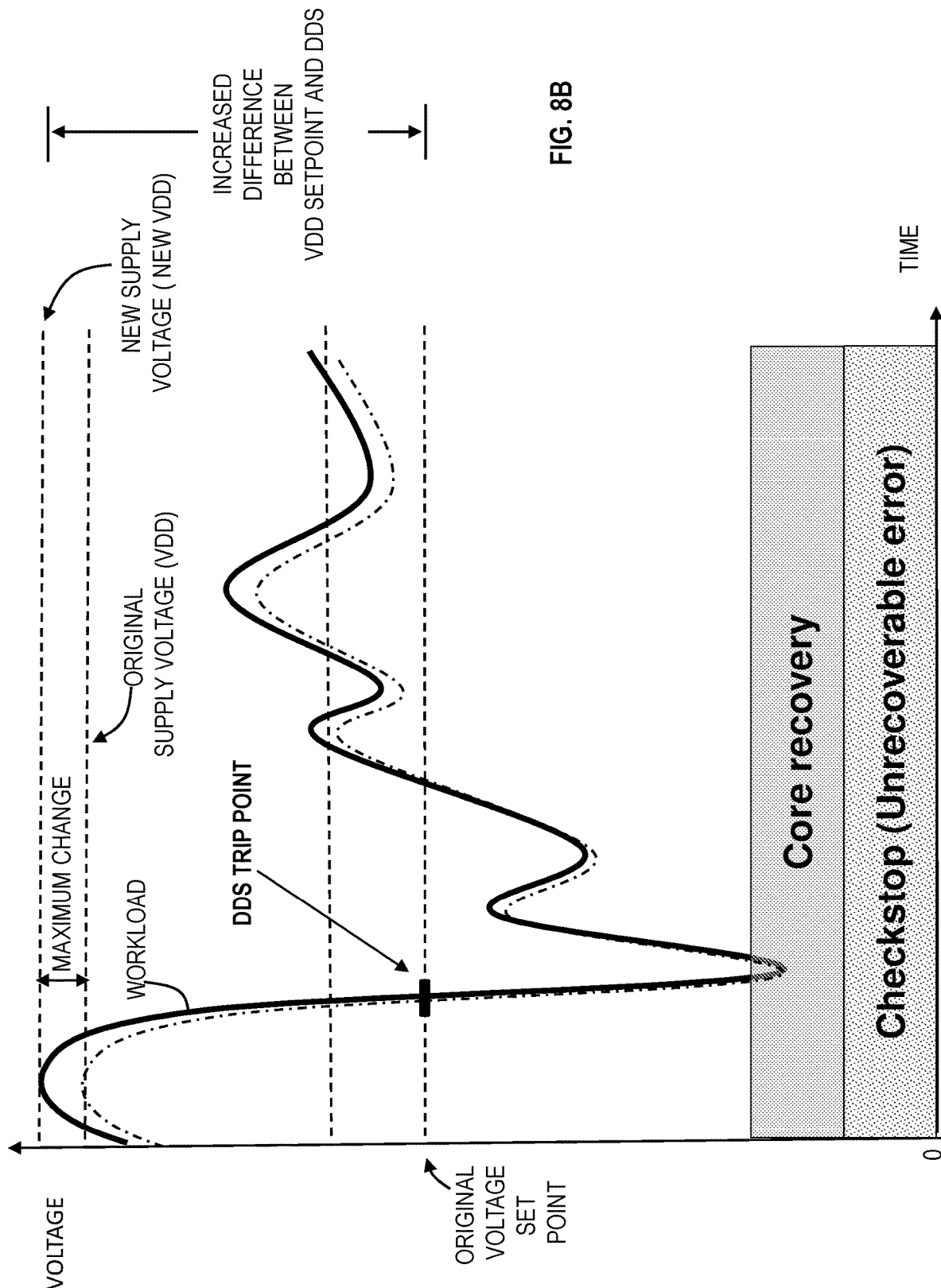
FIG. 8B depicts a graph of the voltage for the core executing a workload over time in which the supply voltage has been increased according to one or more embodiments of the present invention.

According to one or more embodiments, the dynamic guard band with performance protection prevents and/or reduces performance degradation of the core. A chip (e.g., processor) has a given digital droop sensor trip point. Whenever a workload on a core causes the voltage level to cross that digital droop sensor trip point, a given performance degradation will happen. In accordance with one or more embodiments, by increasing the voltage of that core and under the configuration/assumption that the digital droop sensor trip point stays (exactly) at its voltage level, the distance between the new voltage set point for that chip and the digital droop sensor trip point has increased, as depicted in FIGS. 8A and 8B. This then means that, for a workload that previously crossed the digital droop sensor trip point and therefore had a performance hit earlier, with the new voltage set point the same workload will not cross the digital droop sensor trip point anymore and therefore will not see a performance degradation (e.g., a performance hit) anymore. As such, the dynamic guard band with performance protection can dynamically change the voltage set point (also referred to as the VDD voltage, drain voltage, positive supply voltage) to provide dynamic performance protection.

In one or more embodiments, the dynamic guard band with timing protection that dynamically increases/decreases the calibration and tuning of the digital droop sensors within each core can be integrated with the dynamic guard band with performance protection that dynamically increases/decreases the voltage set point (e.g., VDD voltage) of the core. For explanation purposes and ease of understanding, the dynamic guard band with timing protection and the dynamic guard band with performance protection may be discussed separately, but it is contemplated that the functionalities of both are integrated for use to improve the computer system.

One or more embodiments of the invention provide improvements to processors and particularly to improvements in cores on the processor. Optimizing the timing guard band reduces the probability or rate of margin-related circuit errors while minimizing voltage and power for higher efficiency while the performance guard band prevents performance degradation on the core of the processor due to an excessive amount of droop-mitigation actions. This operation of the core results in the improvement of the computer system itself by fine tuning the operation of cores on a processor during runtime, which is when the processor core is executing instructions. Moreover, the dynamic guard band with timing protection and/or the dynamic guard band with performance protection are configured to intensely operate the processor at a high level while reducing the probability or rate of recoverable or unrecoverable circuit errors.

Figure 1:
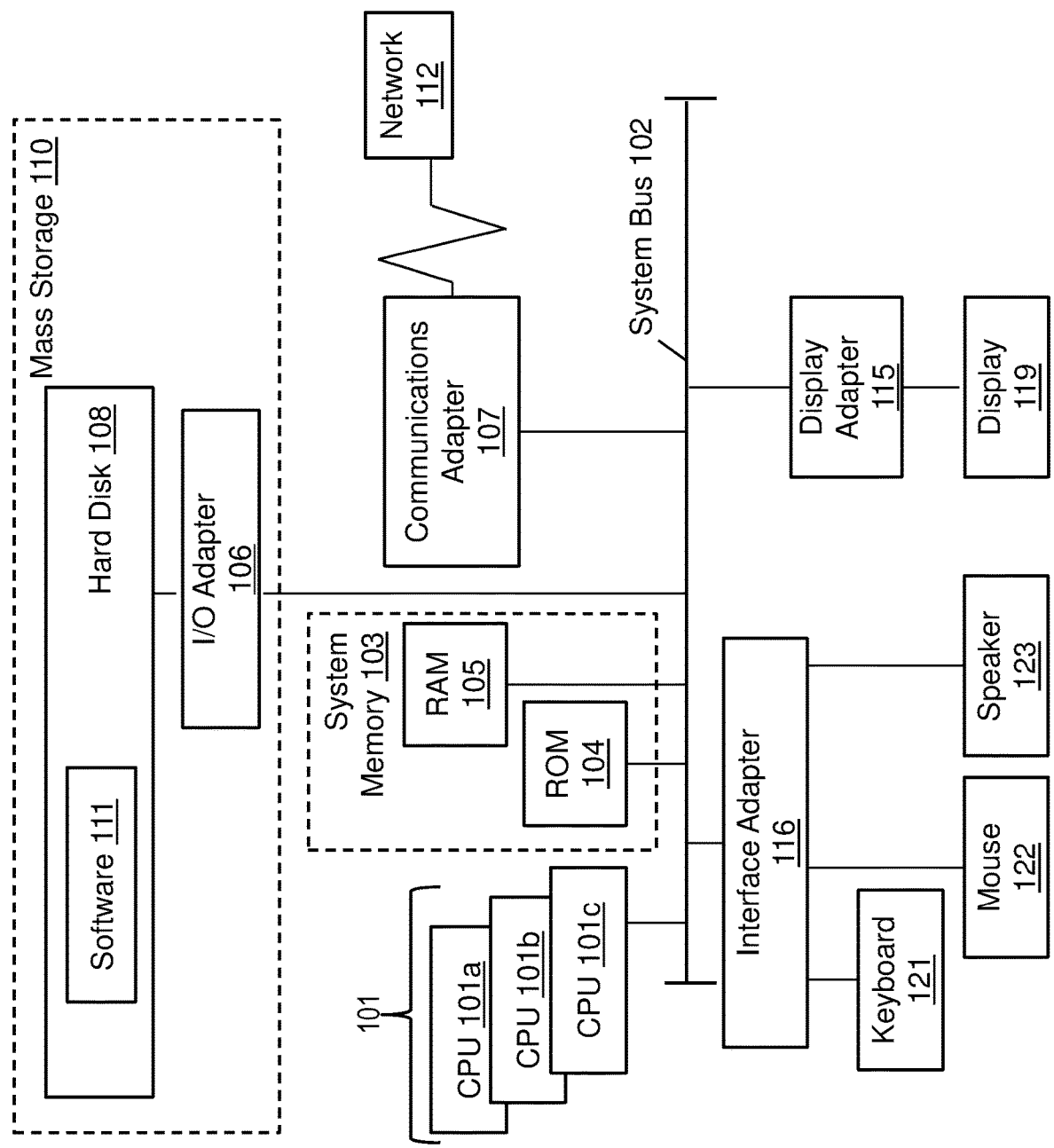
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
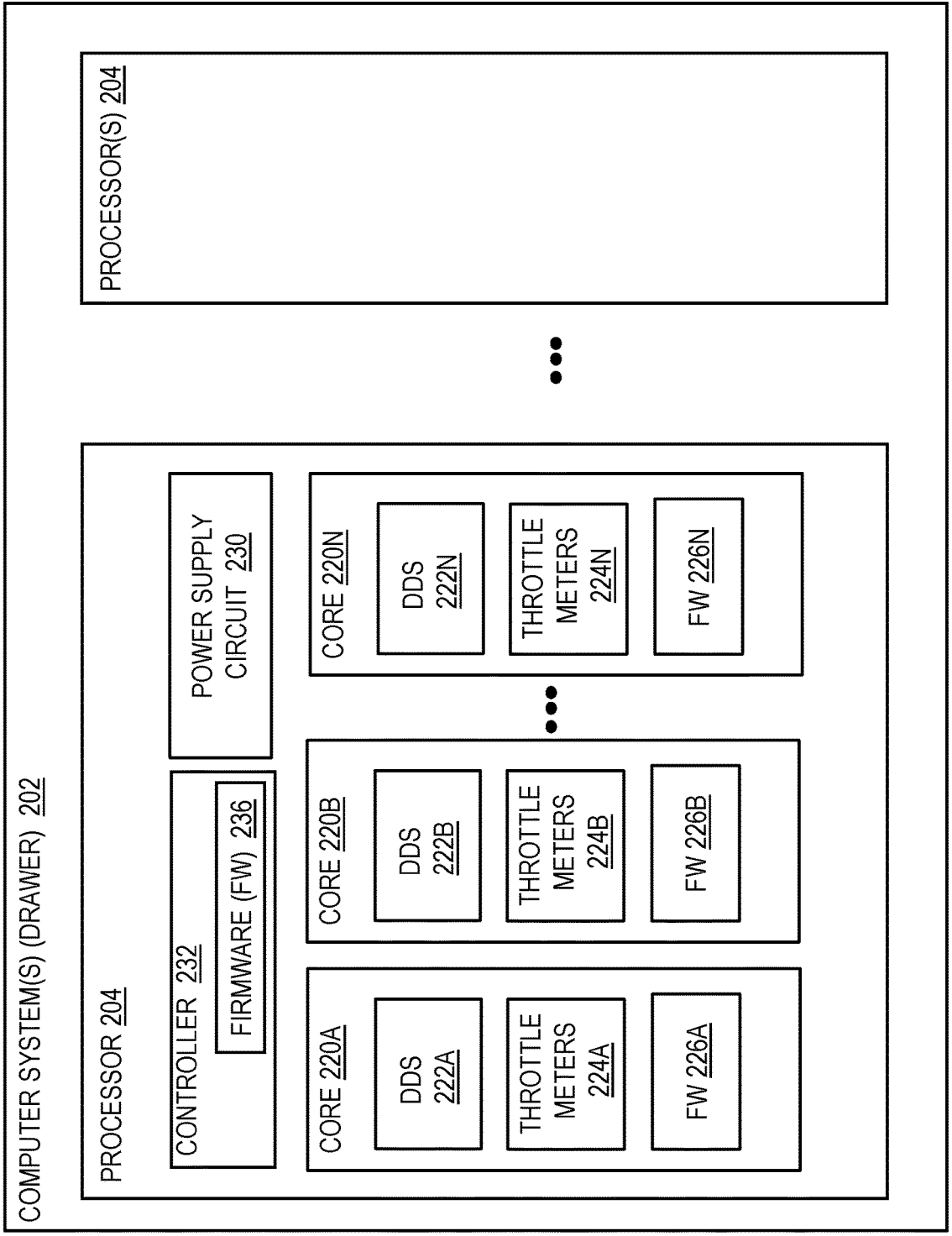
FIG. 2 depicts a block diagram of an example computer system configured to provide a dynamic guard band with timing protection and/or a dynamic guard band with performance protection for processor cores on a processor according to one or more embodiments of the present invention.

FIG. 2 depicts a block diagram of an example computer system 202 configured to provide a dynamic guard band with timing protection and/or a dynamic guard band with performance protection for processor cores on a processor according to one or more embodiments of the invention. There can be many connected processors 204 that form a drawer, and there can be many interconnected drawers. The computer system 202 with multiple processor 204 may be considered a drawer. Many features of computer systems 100 including hardware and software may be integrated in the computer system 202. Computer system 202 includes processors 204 where details of an example processor are illustrated, and the processor 204 has multiple cores 220A-220N, where N represents the last number of the aforementioned elements. Processor cores 220A-220N can generally be referred to as processor cores 220. Processor cores 220A-220N respectively has its own digital droop sensor (DDS) 222A-22N, throttle meter 224A-224N, firmware (FW) 226A-226N. Digital droop sensors 222A-222N can generally be referred to as digital droop sensors 222. Throttle meters 224A-224N can generally be referred to as throttle meters 224. Similarly, firmware 226A-226N can generally be referred to as firmware 226.

One or more power supply circuits 230 are controlled by controller 232 to provide power to respective cores 220A-220N on processor 204. Firmware 236 can be utilized to control one or more operations of the power supply circuit 230 and/or controller 232. In one or more embodiments, any one or more of the firmware 226A-226N and firmware 236 may be configured as (separate) state machines. For example, the firmware 226A-226N and firmware 236 could be implemented as on-chip state machines. A circuit that operates according to a specific sequence of events is called a state machine or sequential circuit. A state machine requires memory to store information about past actions, and it uses that memory to help determine what action to take next.

Figure 12:
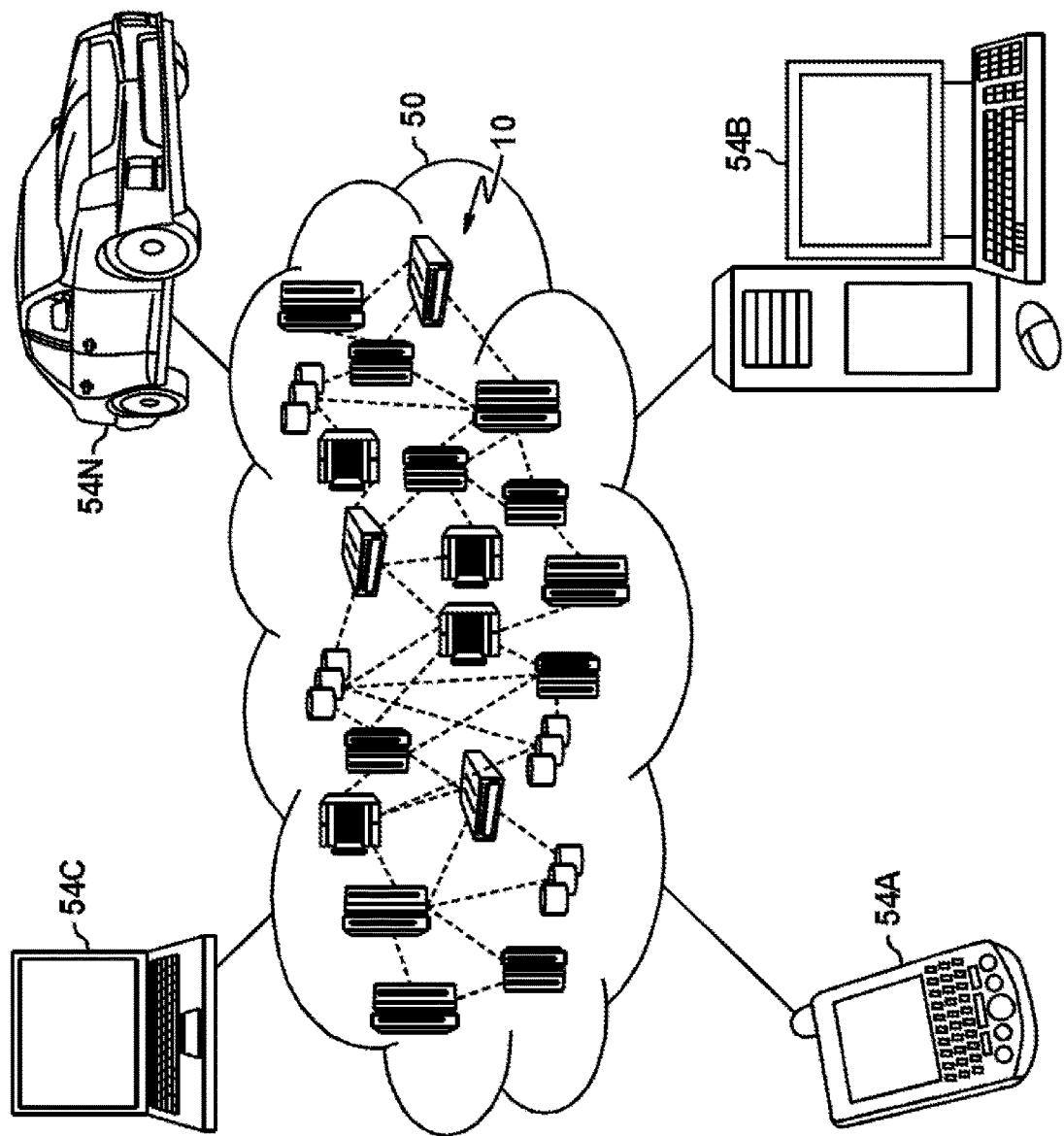
FIG. 12 depicts a cloud computing environment according to one or more embodiments of the present invention.
Figure 13:
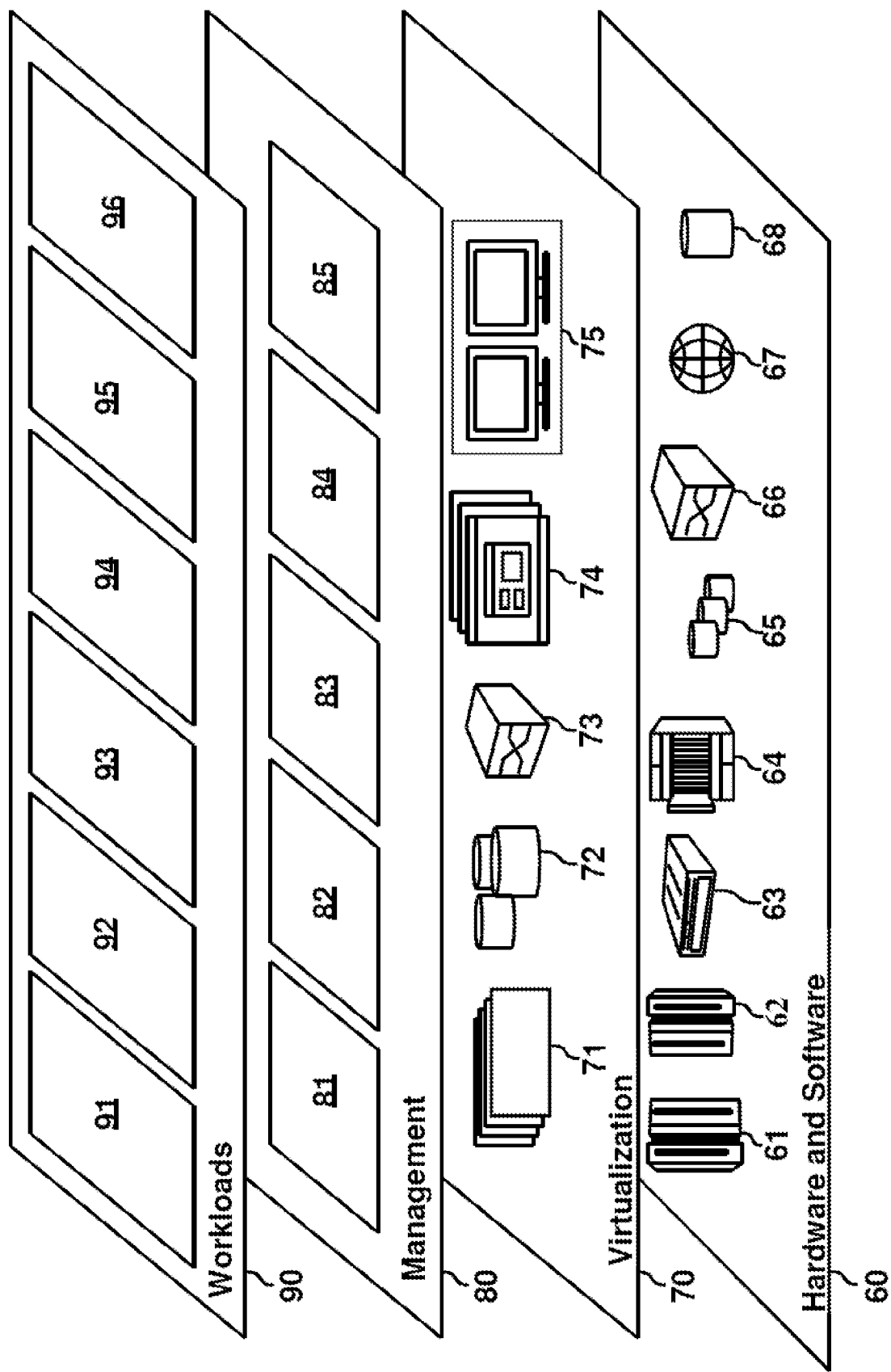
FIG. 13 depicts abstraction model layers according to one or more embodiments of the present invention.

Computer system 202 may include and/or be representative of various software applications such as software 111 which can be executed as instructions on one or more processors 101 in order to perform according to one or more embodiments of the invention. Although not shown, the processor 204 includes all the hardware and software elements to function as understood by one of ordinary skill in the art, including logic units, caches, registers, fetch circuits, decode circuits, execution circuits, clock, busses, etc. The computer system 202 may be representative of one or more portions of a cloud computing environment 50 depicted in FIG. 12. The dynamic guard band with timing protection and/or the dynamic guard band with performance protection can be incorporated and/or integrated in the hardware and software layer 60 depicted in FIG. 13. FIGS. 12 and 13 are discussed further herein.

For ease of understanding and not limitation, an example scenario will use core 220A to illustrate the use of dynamic guard band with timing protection and/or with performance protection. By analogy, it should be appreciated that dynamic guard band with timing protection and/or with performance protection can concurrently be performed in cores 220A-220N according to one or more embodiments. Similarly, dynamic guard band with timing protection and/or with performance protection can concurrently be performed in processor 204.

Figure 3:
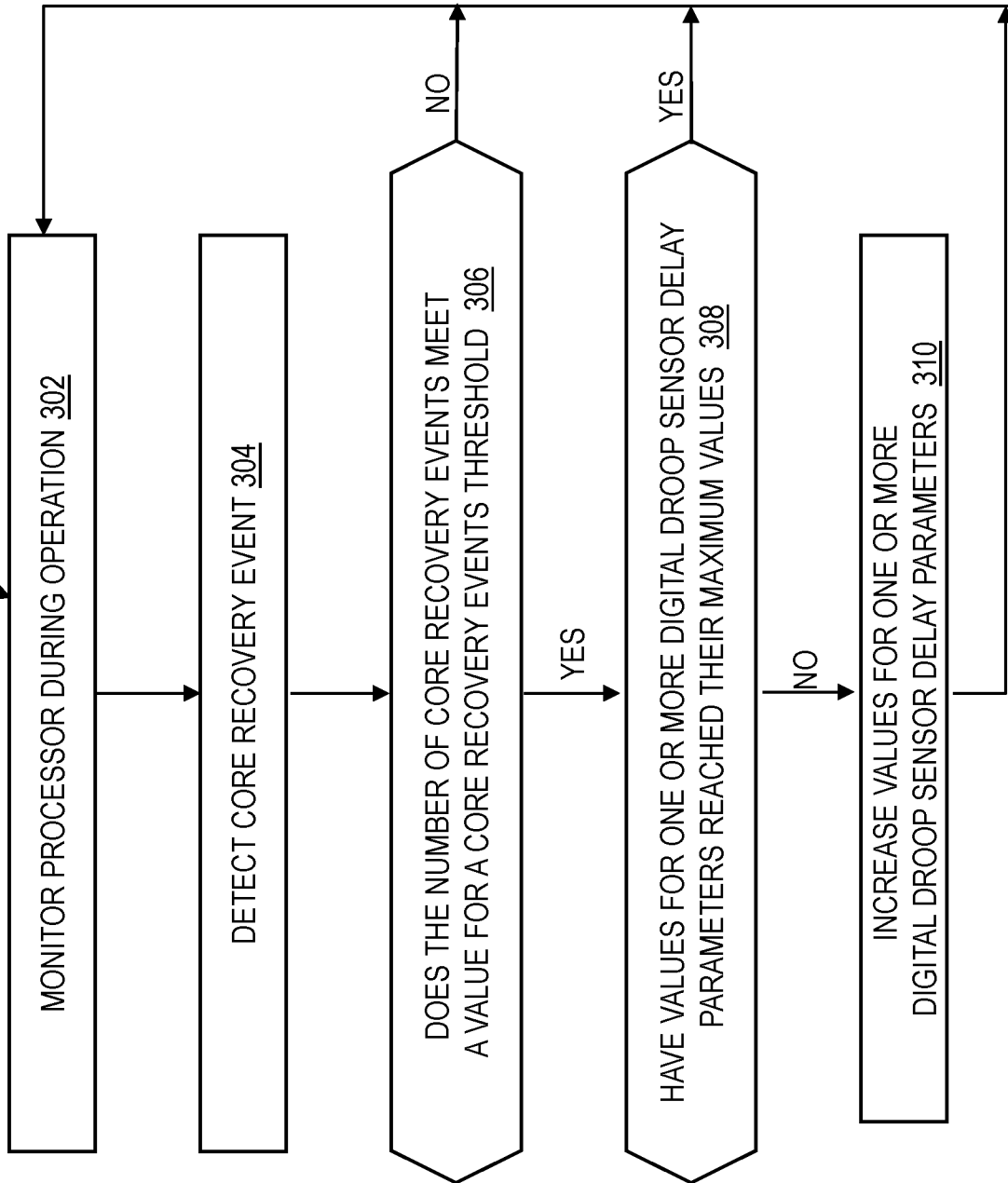
FIG. 3 is a flowchart of a process using dynamic guard band with timing protection for the processor according to one or more embodiments of the present invention.

FIG. 3 is a flowchart of a process 300 using dynamic guard band with timing protection for the processor 204 according to one or more embodiments. Reference can be made to any of the figures discussed herein.

At block 302 of the process 300, firmware 226A of core 220A is configured to monitor the operation of core 220. The firmware 226A can communicate with the digital droop sensor 222A to monitor the droop (or drop) in voltage at the core 220A as the core 220A processes instructions of a workload. The firmware 226A can communicate with the throttle meters 224A to monitor the performance degradation of the core 220A as the core processes the workload. FIG. 7A depicts a graph of the voltage for the core 220 executing a workload over time. As can be seen in FIG. 7A, the core 220 has a default digital droop trip point at a set voltage level (e.g., VPD). In one or more embodiments, each of the cores 220A-220N may have the same digital droop trip point in their respective digital droop sensors 222A-220N. In one or more embodiments, one or more cores 220A-220N may be set with different digital droop trip points, and/or the digital droop trip points of one or more cores may change over time according to their operation. When a core 220 operates above the digital droop trip point, there is no performance hit, and no actions are taken. In other words, the voltage level of the core has not dropped to the digital droop trip point. However, when the processor (or a core 220) reaches or falls below the digital droop trip point, suspend execution events are inserted to some cores 220. When execution events are suspended for cores 220, the effect is that those cores 220 do not execute anymore on each clock cycle but pause for given cycles. This mitigates the voltage droop but also impacts performance. In other words, the execution of instructions is delayed for given clock cycles, thereby identified as suspend execution events.

In FIG. 7A, a core 220 may be allowed to have a voltage droop (drop) into the core recovery (zone) a predetermined number of times, but the core 220 is not allowed and/or is prevented from (ever) drooping (dropping) into the checkstop or unrecoverable error (zone). Core recovery is a process on the processor 202 that resets the core to a last known good architectural state (checkpoint state). Core recovery may include clearing the caches (i.e., array built-in self-test (ABIST)), resetting state machines, and restoring any shadow copies of architectural registers to the last known good state. In other words, the processor 204 is configured to store away the architectural state of given registers. When that is done, the processor 204 is configured to reset the given core 220. As such, the processor 204 is configured to clear the caches (that is done by ABIST), reset the given state machines to IDLE, reload the architectural state to given registers, and then continue to execute from there. All of this happens while the core 220 remains in a running state.

A core unrecoverable error occurs if core recovery is not successful. An unrecoverable error results in a checkstop which then stops the clocks for that core 220, and the core 220 is not able to make forward progress. For some processors 204, there is a process to still evacuate the workloads which were running on that core to a spare core or if no spare core is available add this workload to a core 220 that is already running.

Referring back to FIG. 3, at block 304, the firmware 226A of core 220A is configured to detect a core recovery event. A core recovery event occurs when instructions of a workload are being processed, and the intensity or requirements of the workload cause the voltage of the core 220 to droop to and/or below the core recovery voltage threshold for core recovery. Under normal conditions such as a steady state workload, nominal temperature, etc., the core 220 to runs at its nominal voltage (e.g., at or near the supply voltage) with close to no voltage droop at all. In the case, when that workload switches from an idle state (immediately) to a full execution state, this change in activity manifests in a worst-case voltage droop, as depicted by the large voltage droop crossing the core recovery voltage threshold in FIG. 7A. The DDS trip point must be set above the checkstop threshold because the DDS sense time plus the droop-mitigation reaction time allows the voltage to continue dropping after the voltage passes the DDS trip point.

In response to detecting the core recovery event, the firmware 226A of core 220A is configured to run core recovery. The processor 204 is configured to run core recovery as discussed herein. Further, the processor 204 could execute any core recovery process as understood by one of ordinary skill in the art.

At block 306, if the number of core recovery events in a set period of time has met or exceeded a core recovery events threshold, flow proceeds to block 308. If the number of core recovery events in the set period of time does not meet or exceed the core recovery events threshold, the flow proceeds to block 302.

At block 308, the firmware 226A of core 220A is configured to check whether a value for one or more droop sensor calibration or tuning parameters in digital droop sensor 222A reached their maximum values. In other words, the firmware 226A can check if the droop sensor calibration or tuning parameter is already at the maximum delay, which means no further delay is desired. In one or more embodiments, block 308 may not be triggered until a predetermined number of core recovery events has occurred for the core. For example, 2 core recovery events may be utilized to trigger block 308, because the first recovery event could have been an aberration, but the second recovery event is an indication that further action is warranted for the core. In one or more embodiments, the predetermined number of core recovery events needed to trigger block 308 could range from about 1-5 core recovery events.

Figure 11:
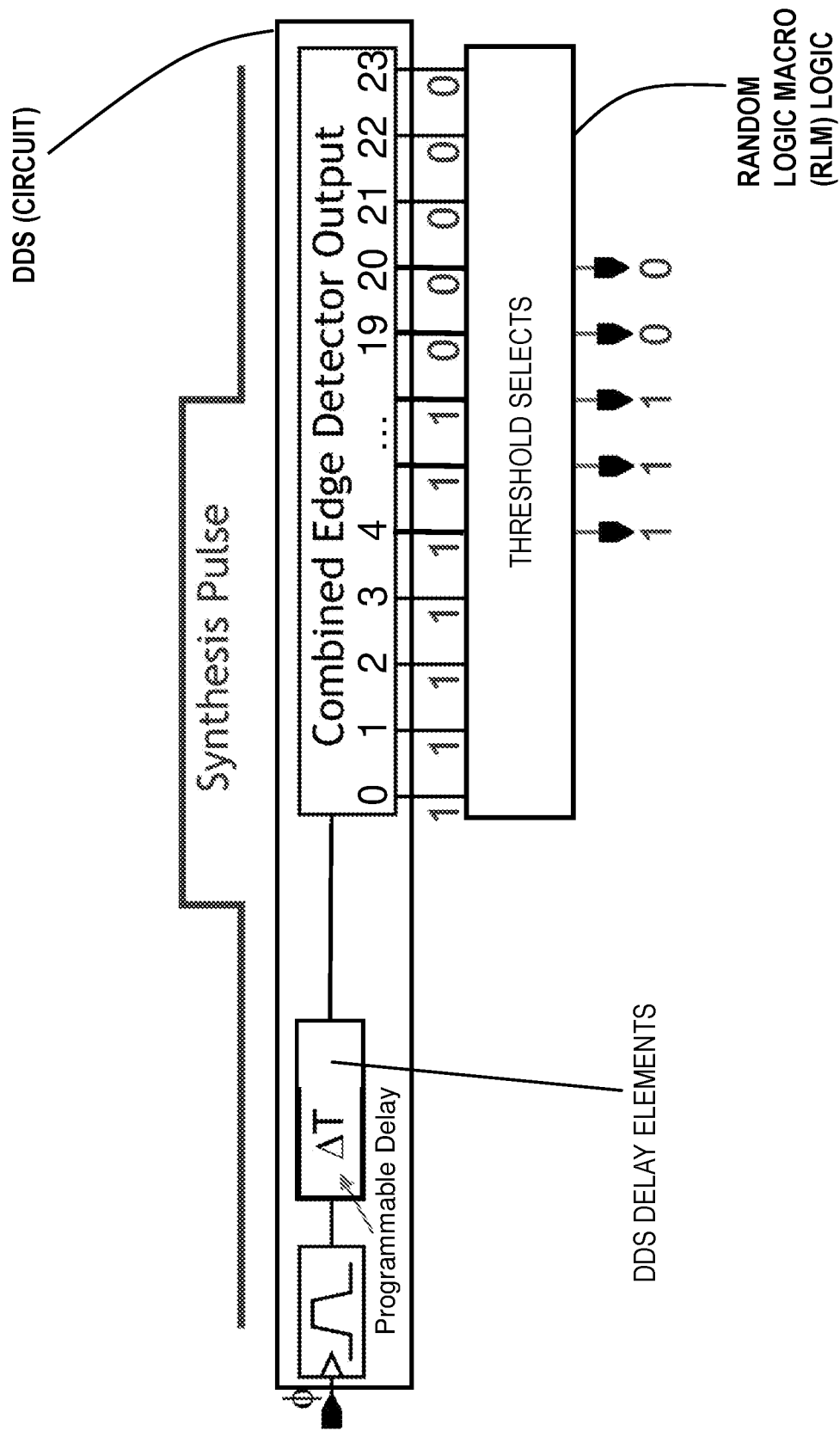
FIG. 11 depicts an example digital droop sensor according to one or more embodiments.

There may be a range of delay units for the droop sensor delay parameter. For example, the range of delay units may range from 0 to 255, where each delay unit could be a 5 picosecond (ps) delay and/or where each delay unit corresponds to adding a delay element. For explanation purposes, a nominal value for the droop sensor delay parameter may be 100 delay units or 500 ps, corresponding to two clock cycles of 250 ps each, when a core has a 4 GHz cycle time. Although example values have been discussed, greater or lower values can be utilized for the delay of a delay unit and cycle time of a core. For illustration purposes, FIG. 11 depicts an example digital droop sensor according to one or more embodiments. The programmable delay can be increased (or decreased) as discussed herein, where an increase in the programmable delay causes instructions of a workload to be delayed in their execution, while a decrease in the programmable delay causes instructions of the workload to not be delayed (or delayed less) in their execution. The programmable delay has a maximum. A maximum delay can also be set delay to limit voltage, current, and power increases that could result when droop sensor delay is increased. When both timing protection and voltage protection are active, increasing timing protection with a droop sensor delay increase may result in more performance loss, and thus may subsequently cause the dynamic margin with performance protection to increase VDD. Without a limit on DDS delays, this could result in exceeding voltage, current, or power limits, and could contribute to thermal run-away. Moreover, the greater the programmable delay setting, the less a signal propagates through the edge detector circuit depicted in FIG. 11 (and the lower the detected edge value is). Lower edge detection values are correlated with voltage droop events, and so they trigger throttling of instruction execution. The programmable delay can thus be used to indirectly set the threshold for the voltage level at which throttling will be triggered.

At block 310, if (NO) the maximum value of the parameter has not been reached, the firmware 226A of core 220A is configured to increase the delay value for the droop sensor calibration or tuning parameter in digital droop sensor 220A. The digital droop sensor 222 (circuit) has delay elements. To increase the digital droop trip point to a higher voltage set point as depicted in FIG. 7B, the firmware 226A causes the digital droop sensor 222 to increment droop sensor delays and/or the trigger threshold. Increasing DDS delays indirectly increases the voltage level of the trip point, or the threshold where instruction execution throttling will be triggered. An example nominal delay value is 100. Then, to increase the digital droop sensor trip point sensitivity, the firmware 226A causes the value (of the digital droop sensor) to increase from 100 to 101, 102, 103, 104, etc., as needed to control the rate of circuit errors and recovery events. When the firmware 226A increases the digital droop sensor trip point, this causes the droop-mitigation reaction to trigger execution throttling at a higher voltage. This throttling causes the voltage to stop drooping and often increase, which gives the core 220 more timing margin during a voltage droop, or during the operation of a high-current of a heavy workload. In addition, the firmware 226A is configured to dynamically reduce the timing margin as discussed below in FIG. 4, when the rate of recovery events drops below a threshold. This reduces the performance caused by droop-mitigation instruction throttling. Since performance loss is decreased, this may also result in the dynamic margin with performance protection control loop which reduces voltage, thereby reducing currents and power for improved efficiency.

As further seen in FIG. 7B, a graph of the voltage is depicted for the core 220 executing the workload over time in which the voltage set point, as the digital droop sensor trip point, has been increased to a new digital droop sensor trip point. The new voltage set point corresponds to increasing the amount of delay for the core 220. As seen in FIG. 7B, there is a maximum voltage that the digital droop sensor trip point can be moved from the original DDS sensor input corresponding to the original DDS delay stored in the VPD. In one or more embodiments, the maximum voltage change for the voltage set point can be 10 millivolts (mV), 15 mV, 20 mV, 25 mV, 30 mV, etc. The firmware 226A may have preset steps/increments to move the DDS delays and the resulting DDS sensor trip point before stopping at the maximum DDS delay. Note that when the clock frequency is changed, the relationship between DDS delay and trip point voltage changes, so these figures represent operation at a single frequency. For example, for each recovery event (or preset number of recovery events), the firmware 226A may move the DDS trip point up to the voltage level "J" mV, where J is a step/increment, and where J could be 5 mV, 10 mV, etc., until amount of the maximum voltage change has been reached for the digital droop sensor trip point.

Figure 4:
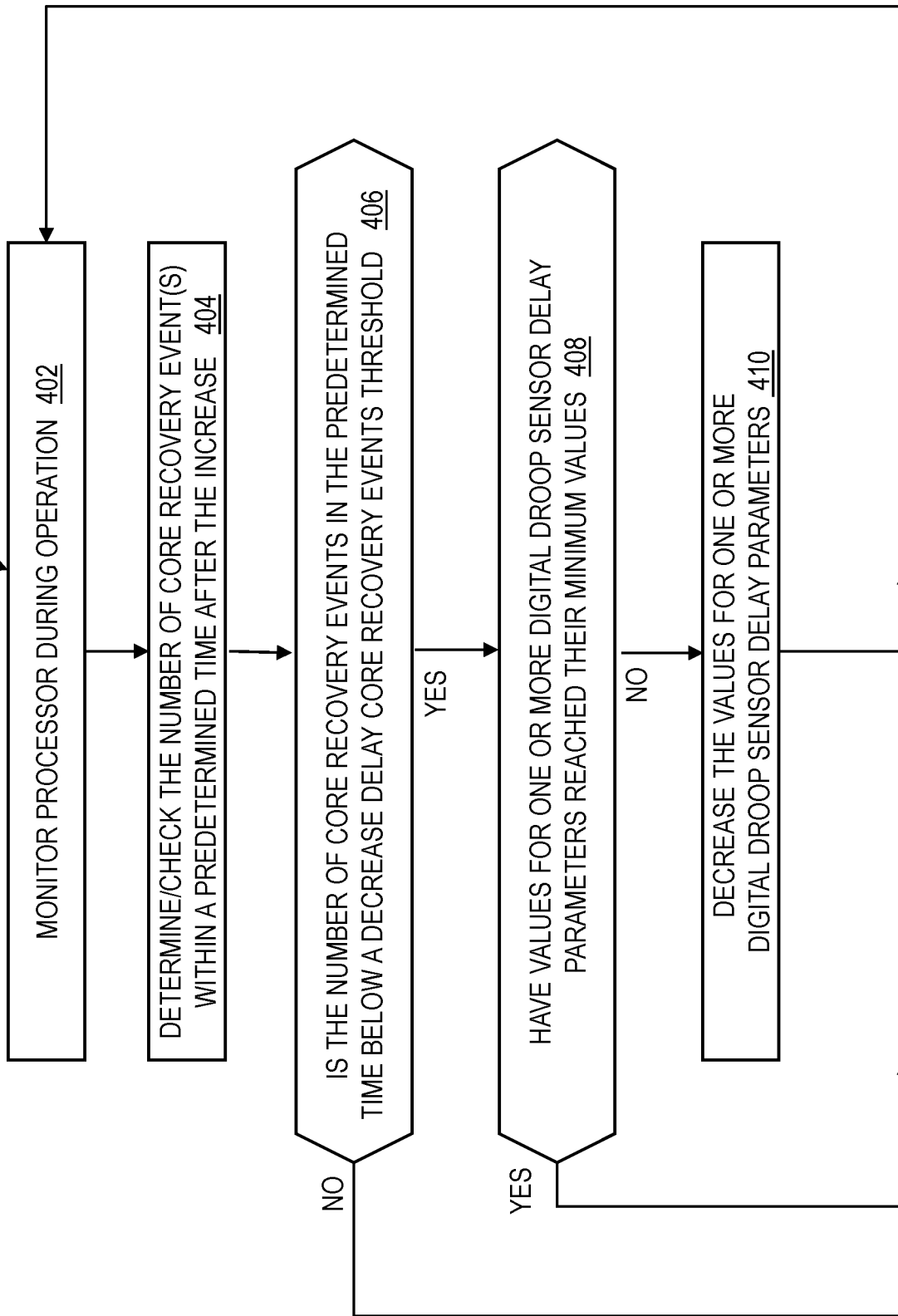
FIG. 4 is a flowchart of a process using dynamic guard band with timing protection for the processor according to one or more embodiments of the present invention.

FIG. 4 is a flowchart of a process 400 using dynamic guard band with timing protection for the processor 204 according to one or more embodiments. FIG. 4 may continue the process discussed in FIG. 3. At block 402 of the process 400, firmware 226A of core 220A is configured to monitor the operation of core 220. The firmware 226A can communicate with the digital droop sensor 222A to monitor the droop (or drop) in voltage at the core 220A as the core 220A processes a workload.

At block 404, the firmware 226A of core 220A is configured to determine/check the number of core recovery events within a predetermined time after the increase to the new/updated voltage level for the voltage set point. The predetermined time after the last increase in the voltage set point for the digital droop sensor trip point can range from about 3 minutes to about 50 minutes. As noted herein, a core recovery event may occur when instructions of a workload are being processed, and the intensity or requirements of the workload cause the voltage of the core 220 to droop to and/or below the core recovery voltage threshold for core recovery.

At block 406, the firmware 226A of core 220A is configured to check if the number of core recovery events in the predetermined time has met and/or dropped below a decrease delay core recovery events threshold. In one or more embodiments, the decrease delay recovery events threshold may be 0 recovery events in the predetermined time. In one or more embodiments, the decrease delay recovery events threshold may be a fewer number of core recovery events than the number of core recovery events that caused the increase in the voltage set point for the digital droop sensor trip point. In one or more embodiments, the decrease delay recovery events threshold may be less than the predetermined number of core recovery events needed to trigger block 308 in FIG. 3. If (NO) the number of core recovery events in the predetermined time has not met and/or dropped below the decrease delay core recovery events threshold, flow returns to block 402 and monitoring of the processor 204 continues.

At block 408, if (YES) the number of core recovery events in the predetermined time has met and/or dropped below the decrease delay core recovery events threshold, the firmware 226A of core 220A is configured to check if the values for one or more digital droop sensor delay parameters reached their minimum values. The range of delay units may range from 0 to 255, such that the minimum value (or lowest value) of the digital droop sensor delay parameter is 0 while the maximum value is 255. It should be appreciated that a different range can be utilized. If (YES) the minimum value for the digital droop sensor delay parameter has been reached, flow returns to block 402.

At block 410, if (NO) the value of the digital droop sensor delay parameter has not reached its minimum value, the firmware 226A of core 220A is configured to decrease the value of one or more digital droop sensor delay parameters by a predetermined amount, thereby decreasing the voltage set point of the digital droop sensor trip point. In one or more embodiments, the sensor trip point of the digital droop sensor trip point may be decremented by the same steps/units that the DDS sensor point can be incremented. The firmware 226A may have preset steps/decrements to move the digital droop sensor trip point before stopping at the minimum digital droop sensor trip point. For example, the firmware 226A may move the digital droop sensor trip point down voltage level "J" mV, where J could be 5 mV, 10 mV, etc., as steps until the amount of the maximum voltage change has been reached for the digital droop sensor trip point. In one or more embodiments, the firmware 226A can decrement the voltage set point of the digital droop sensor trip point the amount of the entire maximum voltage change at one time. In one or more embodiments, the maximum voltage change can be 10 millivolts (mV), 15 mV, 20 mV, 25 mV, 30 mV, etc.

In one or more embodiments, the firmware 226 of core 220 is configured to run a digital droop sensor delay test on the digital droop sensor 222 as a manufacturing test or in the field, identify one or more digital droop sensor delay parameter sets, evaluate the one or more digital droop sensor delay parameter sets, and load a preferred digital droop sensor delay parameter set. Evaluating the one or more digital droop sensor delay parameter sets further comprises the firmware 226 of core 220 comparing the one or more digital droop sensor delay parameter sets, identifying a particular digital droop sensor delay parameter, and selecting the digital droop sensor delay parameter set with the lowest particular digital droop sensor delay parameter as the preferred digital droop sensor delay parameter set. The firmware 226 of core 220 is configured to use timing checks to detect the first number of core recovery events and second number of core recovery events. The digital droop sensor delay parameters of the processor are selected from the group comprising yield and power.

Figure 5:
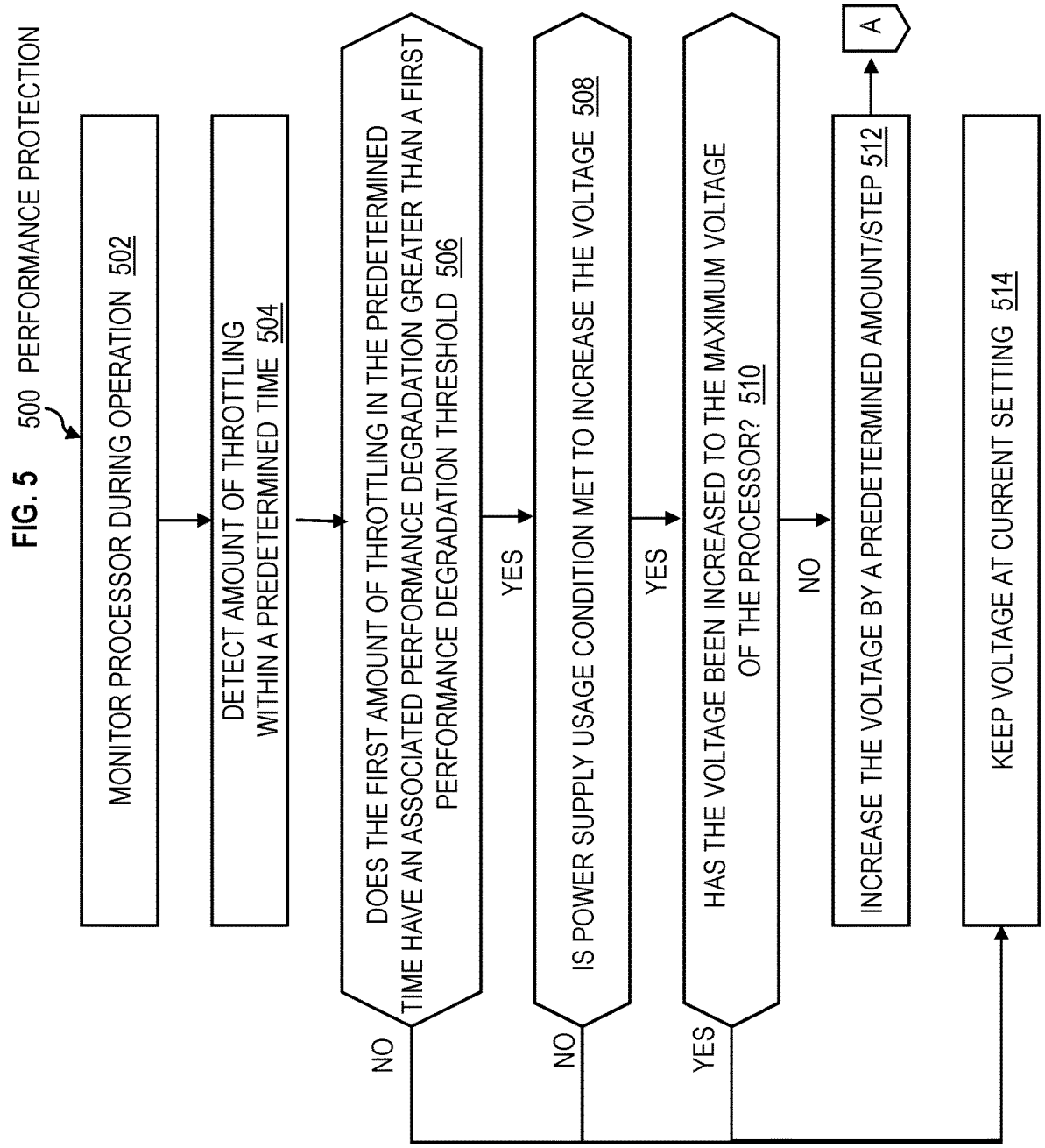
FIG. 5 is a flowchart of a process using dynamic guard band with performance protection for the processor according to one or more embodiments of the present invention.
Figure 6:
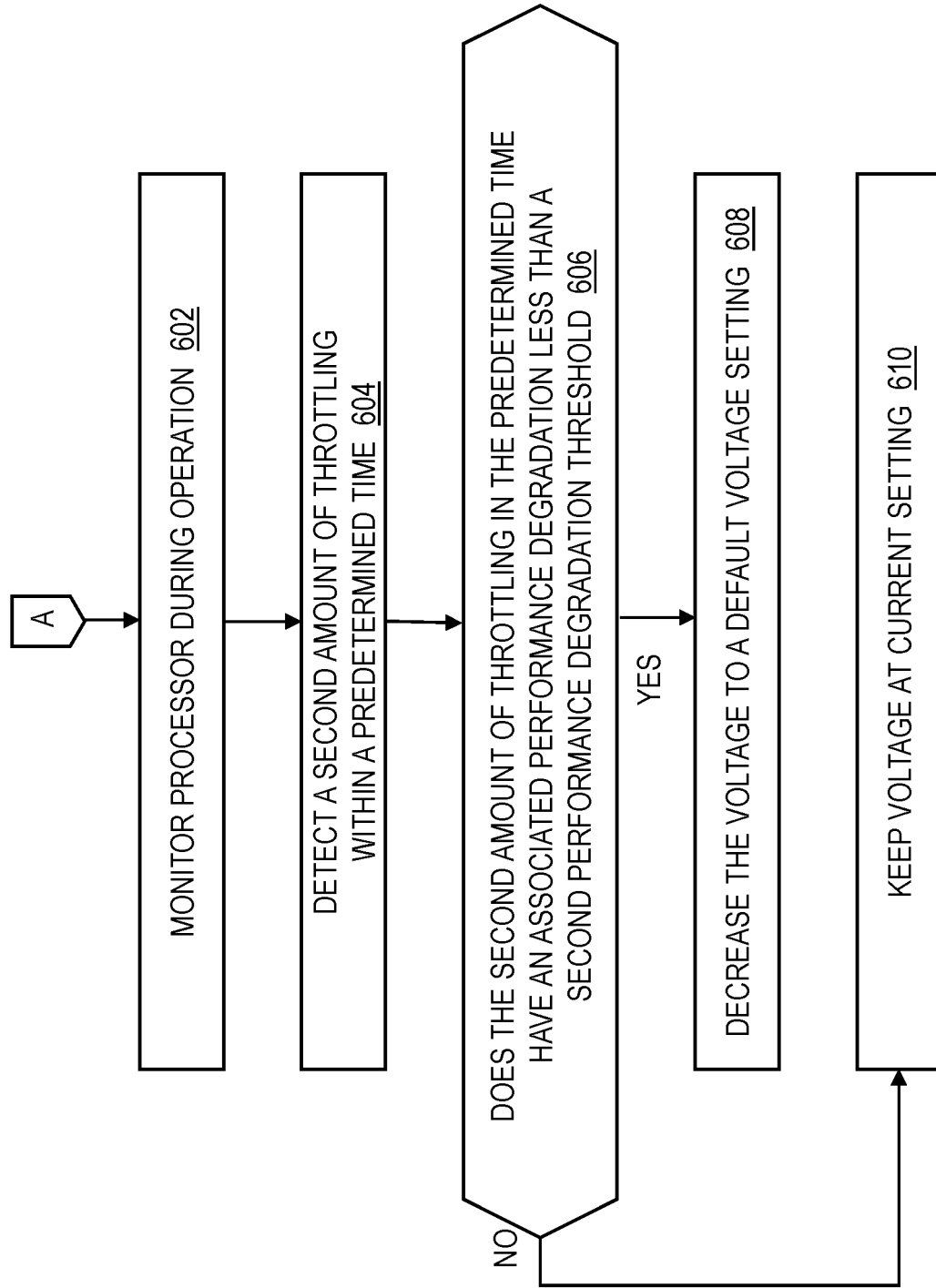
FIG. 6 is a flowchart of a process using dynamic guard band with performance protection for the processor according to one or more embodiments of the present invention.

FIG. 5 is a flowchart of a process 500 using dynamic guard band with performance protection for the processor 204 according to one or more embodiments. Reference can be made to any of the figures discussed herein. In FIGS. 5 and 6, the example scenario using core 220A may be continued for ease of understanding and consistency. Again, it should be appreciated that all cores 220A-220N of processor 204 simultaneously execute dynamic guard band with performance protection and dynamic guard band with timing protection, as discussed herein. Similarly, dynamic guard band with performance protection and dynamic guard band with timing protection can be performed simultaneously for processors 204 in computer system 202.

At block 502 of the process 500, firmware 226A of core 220A is configured to monitor the operation of core 220. The firmware 226A can communicate with the digital droop sensor 222A to monitor the droop (or drop) in voltage at the core 220A as the core 220A processes a workload. The firmware 226A can communicate with the throttle meters 224A to monitor the performance degradation of the core 220A as the core processes the workload. In one or more embodiments, droop mitigation may be accomplished using frequency reduction instead of instruction throttling. In this case, performance loss is caused by core frequency reduction instead of instruction throttling. In this embodiment, a droop event results in frequency reduction instead of instruction throttling. In this embodiment, instead of monitoring instruction throttling to determine performance loss, the firmware monitors frequency reduction to determine performance loss. In one or more embodiments, both instruction throttling and frequency reduction can concurrently be used to mitigate droops. As such, the firmware monitors both instruction throttling and frequency reduction to determine performance loss.

At block 504, the firmware 226A of core 220A is configured to detect a first amount of throttling within a predetermined time for measuring throttling. The throttle meter 224A measures the number of cycles that throttling metering is active in the predetermined time. In this case, the first throttling threshold may range from 1 to millions. In one or more embodiments, the throttling meter measures the number of throttling amounts in a predetermined time.

The throttle meter 224 is a circuit (which may include and/or be coupled to a counter) that provides an indication of how may suspend execution cycles are asserted to respective cores in the processor. Each throttle meter reading corresponds to a (single) suspend execution cycle. This number of suspend execution cycles scales with performance degradation. Consequently, the level of performance degradation of a core 220 directly corresponds to a predetermined number of suspend execution cycles being experienced by the core 220.

In one or more embodiments, the predetermined time for checking throttling amounts may be in the range of microseconds to minutes or hours. In one or more embodiments, the predetermined time for checking throttling amounts may range from about 1 minutes to about 1 hour. In one or more embodiments, the predetermined time for checking throttling amounts may shift from a lower number such as 1 minutes to a higher number such as 5 minutes, as fewer or no throttling amounts are detected from a previous check.

At block 506, the firmware 226A of core 220A is configured to check if the first amount of throttling within the predetermined time for checking throttling has an associated performance degradation greater than a first performance degradation threshold. The first performance degradation threshold could be set at 1% performance degradation of the core 220A. In one or more embodiments, the first performance degradation threshold could be a range from about 0.1% performance degradation to about 3% performance degradation of the core 220A. The performance degradation for first amount of throttling may correspond a certain number of suspend execution cycles, and the firmware 226A can translate the number of suspend execution cycles for core 220A into a percent performance degradation, for example, using a table in the firmware or elsewhere. The firmware 226A is configured to check if the (percent) performance degradation or the number of suspend execution cycles for the first amount of throttling is greater than the first performance degradation threshold, for example, greater than 1% performance degradation.

In one or more embodiments, the first performance degradation threshold could correspond to a suspend execution cycles threshold. In one or more embodiments, the firmware 226A may check if the first amount of throttling having a number of suspend execution cycles (which in one case could be no suspend execution cycles) is greater than the first performance degradation threshold which is number of suspend execution cycles as the threshold.

At block 514, if (NO) the first amount of throttling within the predetermined time for checking throttling amounts has the associated performance degradation that is not greater than the first performance degradation threshold, the firmware 226A of core 220A is configured to keep the supply voltage at its current voltage level (i.e., its current voltage setting). For illustration purposes, FIG. 8A depicts a graph of the voltage for the core 220 executing a workload over time. As can be seen, the workload has its crest or peak at the original/current supply voltage before the voltage droops into the core recovery (zone). It is assumed that no change is made to the supply voltage supplied to core 220A based on blocks 506, 514.

At block 508, if (YES) the first amount of throttling within the predetermined time for checking throttling amounts has the associated performance degradation that is greater than the first performance degradation threshold, the firmware 226A of core 220A is configured to check if a power supply usage condition is met to increase the supply voltage.

The core 220A is on the processor (chip) 204. There can be multiple processor chips 204 in a drawer (or computer system 202). The drawer is interconnected to other drawers using known methods as understood by one having ordinary skill in the art. The power supply usage (PSU) condition is that the PSU of the drawer containing the core 220A is less than the power supply usage threshold (i.e., PSU of drawer<PSU threshold). In one or more embodiments, the PSU threshold could range from about 3000 watts (W) to about 3900 W. If the power supply usage condition is not met (i.e., PSU of drawer>PSU threshold), flow proceeds to block 514 without increasing the supply voltage of the core 220A.

As an additional check for the power supply usage condition that may optionally be added to block 508, the power supply usage may also include confirming that the PSU of the drawer (computer system 202) containing the core 220A is not greater than a maximum power supply usage for the drawer. If not greater, this part of the condition is met or satisfied to increase the supply voltage for the core 220A. On the other hand, if the PSU of the drawer (computer system 202) containing the core 220A is greater than a maximum power supply usage for that drawer, the firmware 226A of core 220A is configured to cause the firmware 236 of the power supply circuit 230 to revert back to the default setting for the supply power to all of the cores 220A-220N in the processor 204.

Further, it is noted that the firmware 236 can be integrated with the controller 232 to control the supply voltage respectively supplied to cores 220A-220N on processor 204. In one or more embodiments, firmware 226 operatively communicates with firmware 236 of the power supply circuit 240 to provide and change the supply voltage provided to cores 220A-220N.

At block 510, if the power supply usage condition is met to increase the supply voltage (i.e., PSU of drawer<PSU threshold) (and optionally include the PSU of the drawer containing the core 220A is not greater than a maximum power supply usage for that drawer), the firmware 226A of core 220A is configured to check if the supply voltage supplied to the core 220A has been increased to the maximum supply voltage for the core 220A. As noted herein, there is a maximum supply voltage change permitted as shown in FIGS. 8A and 8B. The firmware 226A of core 220A checks if the supply voltage has already been increased to the maximum supply voltage allowed. If (YES) the supply voltage supplied to the core 220A has been increased to the maximum supply voltage for the core 220A, flow proceeds to block 514.

At block 512, if (NO) the supply voltage supplied to the core 220A has not been increased to the maximum supply voltage for the core 220A, the firmware 226A of core 220A is configured to increase the supply voltage to the core 220A by a predetermined amount/step. FIG. 8B depicts a graph of the voltage for the core 220 executing a workload over time in which the supply voltage has been increased. In FIG. 8B, increasing the supply voltage vertically shifts the entire graph of the workload up by the increased voltage setpoint increase amount, in cases where droop mitigation is not needed. In FIG. 8B, the dashed curve is illustrative of the old position of the graph for the workload, while the solid curve is the new position of the graph for the workload which shows that the crest is now at the new supply voltage (new VDD). In FIG. 8B, the digital droop sensor trip point remains at voltage set point. Thus, the voltage at the DDS sensor crosses the DDS trip point later in time, and the droop mitigation stops the droop at approximately the same minimum voltage. As noted herein, by increasing the supply voltage of that core 220 and under the assumption that the digital droop sensor trip point remains exactly at the fixed voltage level, the distance between the new supply voltage for that core 220 and the digital droop sensor trip point has increased, as depicted in FIG. 8B. This then means a workload, which has crossed the digital droop sensor trip point (and therefore got a performance hit) earlier, may now (with the new supply voltage setting) not cross the digital droop sensor trip point anymore and therefore will not see a performance hit/degradation anymore. In general, the performance loss will be decreased by an increase in VDD setpoint.

In one or more embodiments, the maximum change to increase the supply voltage to the core 220 may range from about 10 mV-30 mV. In one or more embodiments, there is a predefined number of steps to increase the supply voltage of the core 220. In one or more embodiments, the predetermined amount/steps to increase the supply voltage to the core 220 may be 4 steps, at 5 mV each for a maximum change of 20 mV. In one or more embodiments, the processor 204 can collectively have a total maximum change of about 20 mV (for all of the cores 220). In one or more embodiments, a drawer (or computer system 202) having multiple processors 204 can have a maximum number of predetermined amount/steps. For example, if there are 20 predetermined steps at 5 mV each for a drawer, then the drawer can increase a total of 100 mV.

FIG. 6 is a flowchart of a process 600 using dynamic guard band with performance protection for the processor 204 according to one or more embodiments. FIG. 6 may continue the process discussed in FIG. 5. Reference can be made to any of the figures discussed herein. At block 602 of the process 600, firmware 226A of core 220A is configured to monitor the operation of core 220A. The firmware 226A can communicate with the digital droop sensor 222A to monitor the droop (or drop) in voltage at the core 220A as the core 220A processes a workload. The firmware 226A can communicate with the throttle meters 224A to monitor the performance degradation of the core 220A as the core processes the workload.

At block 604, the firmware 226A of core 220A is configured to detect a second amount of throttling within a predetermined. The second amount of throttling will be the same or less than the first amount of throttling measured by the throttle meter 224A. The second amount of throttling could be 1, 2, 3, 4, 5, 6, through 10 times less than the first amount of throttling. As noted herein, the predetermined time for checking throttling amounts may be about every 2 minutes. In one or more embodiments, the predetermined time for checking throttling amounts may range from about (a few) microseconds to 24 hours. In one or more embodiments, the predetermined time for checking throttling amounts may shift from a lower number such as 2 minutes to a higher number such as 5 minutes, as fewer or no throttling amounts are detected from a previous check.

At block 606, the firmware 226A of core 220A is configured to check if the second amount of throttling within the predetermined time for checking throttling amounts has an associated performance degradation less than a second performance degradation threshold. The second performance degradation threshold could be set at 0.1% performance degradation of the core 220A. In one or more embodiments, the second performance degradation threshold could be a range from about 0.00% performance degradation to about 1.0% performance degradation of the core 220A. Analogous to the discussion above, the performance degradation second amount of throttling may identify a certain number of suspend execution cycles, and the firmware 226A can translate the number of suspend execution cycles for core 220A into a percent performance degradation, for example, using a table in the firmware or elsewhere. The firmware 226A is configured to check if the (percent) performance degradation or the number of suspend execution cycles for the second amount of throttling is less than the second performance degradation threshold, for example, less than 0.1% performance degradation.

In one or more embodiments, the second performance degradation threshold could correspond to a suspend execution cycles threshold. In one or more embodiments, the firmware 226A may check if the second amount of throttling having a number of suspend execution cycles (which in one case could be no suspend execution cycles) is less than the second performance degradation threshold which is a number of suspend execution cycles (as the threshold).

At block 608, if (YES) the second amount of throttling within the predetermined time for checking throttling amounts has the associated performance degradation that is less than the second performance degradation threshold, the firmware 226A of core 220A is configured to decrease the supply voltage. Analogous to the maximum change to increase the supply voltage to the core 220 and the predetermined amount/steps for each increase discussed in FIG. 5, the same may apply to decreasing the supply voltage to the core. In one or more embodiments, the maximum change to decrease the supply voltage to the core 220 may range from about 10 mV-30 mV. In one or more embodiments, there is a predefined number of predetermined amount/steps to decrease the supply voltage of the core 220. In one or more embodiments, the predetermined amount/steps to decrease the supply voltage to the core 220 may be 4 steps, at 5 mV each for a maximum change of 20 mV. In one or more embodiments, the processor 204 can collectively have a total maximum change of about 20 mV (for all of the cores 220).

In one or more embodiments, the supply voltage could be decreased to a default supply voltage setting. In one case, the default supply voltage setting could be the original supply voltage setting depicted in FIG. 8B.

At block 610, if (NO) the second amount of throttling within the predetermined time for checking throttling amounts has the associated performance degradation that is greater than the second performance degradation threshold, the firmware 226A of core 220A is configured to keep the supply voltage at the current setting.

FIG. 9 is a flowchart of a computer-implemented method 900 for dynamic guard band with timing protection for processor cores 220 of the processor 204 according to one or more embodiments. Reference can be made to any of the figures discussed herein. At block 902, firmware 226 of core 220 (of computer system 202) is configured to in response to monitoring a processor 204 during operation, detect a first number of core recovery events in the processor 204. The first number of core recovery events are for a core 220, such as core 220A. In one or more embodiments, the first number (and second number below) could be collectively for cores 220A-220N.

At block 904, the firmware 226 of core 220 (of computer system 202) is configured to determine that the first number of core recovery events fulfills a first condition for the first core recovery events threshold. For example, a predetermined number of core recovery events may occur to thereby fulfill the first condition for the first core recovery events threshold, as discussed in block 308 in FIG. 3.

At block 906, the firmware 226 of core 220 (of computer system 202) is configured to modify a value of at least one digital droop sensor delay parameter (of the digital droop sensor 222) of the processor 204 by a first amount, the at least one digital droop sensor delay parameters affecting execution of one or more instructions on the processor 204. For example, reference can be made to the discussion of block 310 in FIG. 3. As a technical solution/benefit, the firmware 226 is configured to adjust the droop threshold (e.g., by increasing delay in the digital droop sensor 222) which correspondingly increases sensitivity to voltage droops and low voltages, thus reducing the probability or rate of recovery events. Although the digital droop sensor 222 has delay adjustments to adjust the droop threshold, one or more embodiments can utilize other kinds of droop sensors that have a voltage adjustment knob (or parameter), or some other method of adjusting the droop threshold(s). For example, there can be an analog droop sensor that triggers droop reaction for droop mitigation. As such, the digital droop sensor parameter can be implemented as a voltage adjustment (increase/decrease) that is analogously increased and decreased just as the delay in the digital droop sensor 222, in accordance with the one or more embodiments.

At block 908, the firmware 226 of core 220 (of computer system 202) is configured to in response to modifying the value of the at least one digital droop sensor delay parameter (of the digital droop sensor 222) by the first amount, detect a second number of core recovery events in the processor 204.

At block 910, the firmware 226 of core 220 (of computer system 202) is configured to determine that the second number of core recovery events fulfills a second condition for a second core recovery events threshold. For example, a second condition for the second core recovery events threshold (e.g., decrease delay core recovery events threshold) is fulfilled, as discussed in block 406 of FIG. 4.

At block 912, the firmware 226 of core 220 (of computer system 202) is configured to modify the value of the at least one digital droop sensor delay parameter of the processor by a second amount. For example, reference can be made to block 410 of FIG. 4.

Modifying the value of the at least one digital droop sensor delay parameter of the processor 204 by the first amount comprises increasing the value of at least one digital droop sensor delay parameter of the processor by the first amount. For example, the firmware 226A can instruct the digital droop sensor 222A to increase the value of at least one digital droop sensor delay parameter. Modifying the value of the at least one digital droop sensor delay parameter of the processor 204 by the second amount comprises decreasing the value of the at least one digital droop sensor delay parameter of the processor by the second amount. For example, the firmware 226A can instruct the digital droop sensor 222A to decrease the value of at least one digital droop sensor delay parameter.

Fulfilling the first condition for the first core recovery events threshold comprises the first number of core recovery events being greater than the first core recovery events threshold. For example, the firmware 226 may determine that the predetermined number of core recovery events is greater than the first core recovery events threshold, as discussed with block 308. Fulfilling the second condition for the second core recovery events threshold comprises the second number of core recovery events being less than the second core recovery events threshold. For example, the firmware 226 may determine that the number of core recovery events in the predetermined time has dropped below the decrease delay core recovery events threshold.

Modifying the value of the at least one digital droop sensor delay parameter of the processor 204 by the second amount comprises reverting to a baseline value for the at least one digital droop sensor delay parameter. The firmware 226 can instruct the digital droop sensor 222 to revert to the baseline value for the least one digital droop sensor delay parameter(s). The baseline value could be 0 delay. The baseline value could be 100 delay elements. The second amount in which the value of the at least one digital droop sensor delay parameter is decreased could be greater than the first amount, equal to the first amount, or less than the first amount. The control loops discussed herein can continue indefinitely during operation of the processor. Also, although the recovery event can be for a core, it should be appreciated that the recovery event could be triggered by a recovery event in a circuit smaller or larger than "a core".

FIG. 10 is a flowchart of a computer-implemented method 1000 for dynamic guard band with performance protection for processor cores 220 of the processor 204 according to one or more embodiments. Reference can be made to any of the figures discussed herein.

At block 1002, firmware 226 of core 220 (of computer system 202) is configured to in response to monitoring a processor 204 during operation, detect a first amount of throttling in the processor 204. The first amount of throttling is a predetermined number of throttle meter readings of the throttle meter 224. An example is discussed in block 504 of FIG. 5.

At block 1004, the firmware 226 of core 220 (of computer system 202) is configured to determine that the first amount of throttling fulfills a first condition regarding a throttling amounts threshold. The first amount of throttling has an associated performance degradation. The first condition is fulfilled because the associated performance degradation for the first amount of throttling is greater than the first performance degradation threshold, for example, as discussed with block 506 in FIG. 5. The first performance degradation threshold could be set at 1%, 2%, 3%, etc., performance degradation of the core 220. The performance degradation of the first amount of throttling may correspond to a certain number of suspend execution cycles.

At block 1006, the firmware 226 of core 220 (of computer system 202) is configured to modify a voltage level of the processor 204 by a first amount. The firmware 226 may instruct and/or communicate with firmware 236 of the power supply circuit 230 to modify the voltage level. An example of modifying the voltage level is depicted in block 512 of FIG. 5.

At block 1008, the firmware 226 of core 220 (of computer system 202) is configured to, in response to modifying the voltage level of the processor 204 by the first amount, detect a second amount of throttling in the processor 204. The second amount of throttling is a predetermined threshold of the throttle meter 224, subsequent to the modifying (e.g., increasing) the voltage level.

At block 1010, the firmware 226 of core 220 (of computer system 202) is configured to determine that the second amount of throttling fulfills a second condition regarding the throttling amounts threshold.

The second amount of throttling has an associated performance degradation. The second condition is fulfilled because the associated performance degradation for the second amount of throttling is less than the second performance degradation threshold, for example, as discussed with block 606 in FIG. 6. As an example, the second performance degradation threshold can be set at 0.1% performance degradation of the core 220, or the second performance degradation threshold can be any number in the range of about 0.0% performance degradation to about 1.0% performance degradation of the core 220.

At block 1012, the firmware 226 of core 220 (of computer system 202) is configured to modify the voltage level of the processor 204 by a second amount.

The firmware 226 may instruct and/or communicate with firmware 236 of the power supply circuit 230 to modify the voltage level. An example of modifying the voltage level is depicted in block 608 of FIG. 6.

Modifying the voltage level of the processor 204 by the first amount comprises increasing the voltage level of the processor by the first amount, for example, as depicted in block 512 of FIG. 5. Modifying the voltage level of the processor 204 by the second amount comprises decreasing the voltage level of the processor by the second amount, for example, as depicted in block 608 of FIG. 6.

The firmware 226 of core 220 is configured to confirm that a power supply usage is less than a power supply usage threshold, prior to modifying the voltage level of the processor by the first amount. The firmware 226 of core 220 is configured to check if a power supply usage (PSU) is greater than a power supply usage threshold (e.g., block 508), reject (e.g., by the firmware 236 and/or firmware 226) a request to modify the voltage level by the first amount, and stay a current voltage level, in response to the power supply usage being greater than the power supply usage threshold (e.g., block 514). The firmware 226 of core 220 is configured to provide a condition that reverts the voltage level to a default voltage level in response to determining that a power supply usage is greater than maximum power supply usage threshold. The first amount ranges from about 5 millivolts (mV) to 10 mV, for modifying the voltage level of the processor 204.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
in response to monitoring a processor during operation, detecting, by a computer, a first number of throttling amounts in the processor, the first number of throttling amounts corresponding to a suspension of execution events;
determining, by the computer, that the first number of throttling amounts fulfills a first condition regarding a throttling amounts threshold;
modifying, by the computer, a voltage level of the processor by a first amount;
in response to modifying the voltage level of the processor by the first amount, detecting, by the computer, a second number of throttling amounts in the processor;
determining, by the computer, that the second number of throttling amounts fulfills a second condition regarding the throttling amounts threshold; and
modifying, by the computer, the voltage level of the processor by a second amount.

2. The computer-implemented method of claim 1, wherein modifying the voltage level of the processor by the first amount comprises increasing the voltage level of the processor by the first amount.

3. The computer-implemented method of claim 1, wherein modifying the voltage level of the processor by the second amount comprises decreasing the voltage level of the processor by the second amount.

4. The computer-implemented method of claim 1, further comprising confirming that a power supply usage is less than a power supply usage threshold, prior to modifying the voltage level of the processor by the first amount.

5. The computer-implemented method of claim 1, further comprising checking if a power supply usage is greater than a power supply usage threshold; and
rejecting a request to modify the voltage level by the first amount and staying a current voltage level, in response to the power supply usage being greater than the power supply usage threshold.

6. The computer-implemented method of claim 1, further comprising providing a condition that reverts the voltage level to a default voltage level in response to determining that a power supply usage is greater than maximum power supply usage threshold.

7. The computer-implemented method of claim 1, wherein the first amount ranges from about 5 millivolts (mV) to 10 mV.

8. A system comprising:
a memory having computer readable instructions; and
a computer for executing the computer readable instructions, the computer readable instructions controlling the computer to perform operations comprising:
in response to monitoring a processor during operation, detecting a first number of throttling amounts in the processor, the first number of throttling amounts corresponding to a suspension of execution events;
determining that the first number of throttling amounts fulfills a first condition regarding a throttling amounts threshold;
modifying a voltage level of the processor by a first amount;
in response to modifying the voltage level of the processor by the first amount, detecting a second number of throttling amounts in the processor;
determining that the second number of throttling amounts fulfills a second condition regarding the throttling amounts threshold; and
modifying the voltage level of the processor by a second amount.

9. The system of claim 8, wherein modifying the voltage level of the processor by the first amount comprises increasing the voltage level of the processor by the first amount.

10. The system of claim 8, wherein modifying the voltage level of the processor by the second amount comprises decreasing the voltage level of the processor by the second amount.

11. The system of claim 8, further comprising confirming that a power supply usage is less than a power supply usage threshold, prior to modifying the voltage level of the processor by the first amount.

12. The system of claim 8, further comprising checking if a power supply usage is greater than a power supply usage threshold; and
rejecting a request to modify the voltage level by the first amount and staying a current voltage level, in response to the power supply usage being greater than the power supply usage threshold.

13. The system of claim 8, further comprising providing a condition that reverts the voltage level to a default voltage level in response to determining that a power supply usage is greater than maximum power supply usage threshold.

14. The system of claim 8, wherein the first amount ranges from about 5 millivolts (mV) to 10 mV.

15. A computer program product comprising a computer readable storage medium having program instructions embodied therewith, the program instructions executable by a computer to cause the computer to perform operations comprising:
in response to monitoring a processor during operation, detecting, by the computer, a first number of throttling amounts in the processor, the first number of throttling amounts corresponding to a suspension of execution events;
determining, by the computer, that the first number of throttling amounts fulfills a first condition regarding a throttling amounts threshold;
modifying, by the computer, a voltage level of the processor by a first amount;
in response to modifying the voltage level of the processor by the first amount, detecting, by the computer, a second number of throttling amounts in the processor;
determining, by the computer, that the second number of throttling amounts fulfills a second condition regarding the throttling amounts threshold; and
modifying, by the computer, the voltage level of the processor by a second amount.

16. The computer program product of claim 15, wherein modifying the voltage level of the processor by the first amount comprises increasing the voltage level of the processor by the first amount.

17. The computer program product of claim 15, wherein modifying the voltage level of the processor by the second amount comprises decreasing the voltage level of the processor by the second amount.

18. The computer program product of claim 15, further comprising confirming that a power supply usage is less than a power supply usage threshold, prior to modifying the voltage level of the processor by the first amount.

19. The computer program product of claim 15, further comprising checking if a power supply usage is greater than a power supply usage threshold; and
   rejecting a request to modify the voltage level by the first amount and staying a current voltage level, in response to the power supply usage being greater than the power supply usage threshold.

20. The computer program product of claim 15, further comprising providing a condition that reverts the voltage level to a default voltage level in response to determining that a power supply usage is greater than maximum power supply usage threshold.

* * * * *